US012571113B2

(12) United States Patent
Choi et al.

(10) Patent No.: US 12,571,113 B2
(45) Date of Patent: Mar. 10, 2026

(54) PHOTO-ENHANCED ELECTRO-CATALYTIC (PEEC) PROCESS

(71) Applicant: Space Age Technologies, LLC, Poquoson, VA (US)

(72) Inventors: Sang H. Choi, Poquoson, VA (US); Robert W. Moses, Poquoson, VA (US)

(73) Assignee: SPACE AGE TECHNOLOGIES, LLC, Poquoson, VA (US)

( * ) Notice: Subject to any disclaimer, the term of this patent is extended or adjusted under 35 U.S.C. 154(b) by 906 days.

(21) Appl. No.: 17/700,577

(22) Filed: Mar. 22, 2022

(65) Prior Publication Data

US 2022/0307144 A1    Sep. 29, 2022

Related U.S. Application Data

(60) Provisional application No. 63/166,669, filed on Mar. 26, 2021.

(51) Int. Cl.
| | |
|---|---|
| *C25B 1/55* | (2021.01) |
| *B01J 19/08* | (2006.01) |
| *B01J 19/12* | (2006.01) |
| *C25B 9/50* | (2021.01) |

(52) U.S. Cl.
CPC .............. *C25B 1/55* (2021.01); *B01J 19/082* (2013.01); *B01J 19/123* (2013.01); *B01J 19/125* (2013.01); *C25B 9/50* (2021.01)

(58) Field of Classification Search
CPC ...................................................... C25B 1/55
See application file for complete search history.

(56) References Cited

U.S. PATENT DOCUMENTS

| | | | | |
|---|---|---|---|---|
| 6,183,695 B1 * | 2/2001 | Godec | ................. | G01N 31/005 |
| | | | | 422/77 |
| 2004/0118348 A1 * | 6/2004 | Mills | ........................ | G21K 1/00 |
| | | | | 118/723 MW |
| 2004/0179647 A1 * | 9/2004 | Zhao | ........................ | G01V 5/22 |
| | | | | 378/57 |
| 2006/0073605 A1 * | 4/2006 | Horan | ................. | G01N 31/005 |
| | | | | 436/155 |
| 2008/0311011 A1 * | 12/2008 | Tsai | ..................... | B01D 53/864 |
| | | | | 422/186.3 |
| 2018/0011024 A1 | 1/2018 | Reed et al. | | |

OTHER PUBLICATIONS

PCT Patent Application Serial No. PCT/US2022/021260; Notification of Transmittal of International Search Report and the Written Opinion of the International Searching Authority; date of Mailing Jul. 5, 2022; 13 pages.

* cited by examiner

*Primary Examiner* — Luan V Van
(74) *Attorney, Agent, or Firm* — STAAS & HALSEY LLP

(57) ABSTRACT

A photo-catalyst ($E_P$) is regarded as an alternate method to replace the plasma chemical process and as an additional catalytic processing scheme on top of a micro- or nano-structured catalyst ($E_C$) and electro-catalyst ($E_V$). The potential energy reduction that results from the effect of photo-enhanced electro-catalyst (PEEC) is significant.

17 Claims, 14 Drawing Sheets

PHOTO-ENHANCED ELECTRO-CATALYTIC (PEEC) PROCESS

The present application claims the benefit of U.S. Provisional Patent Application No. 63/166,669 filed Mar. 26, 2021, entitled Photo-Enhanced Electro-Catalytic (PEEC) Process, which is incorporated by reference herein in its entirety.

BACKGROUND

The present invention relates to catalytic systems and processes that include both electro-assisted or photo-assisted features. This invention comes with a new approach for better catalytic effect to answer to various demands without regard to the conventional issues of overpotential barrier while lowering kinetic barrier. Specifically, the system and process break down aqueous or gaseous molecules into environmentally friendly or demand-oriented useful components at a fraction of the energy (cost) of current and other methods.

The platinum group metals (PGM) family has long been used as catalytic agents. This group of metals consists of the densest known metals and comprises six transitional metal elements that, structurally and chemically, are very similar. They are platinum, palladium, rhodium, iridium, ruthenium and osmium. With high durability and long lifecycles, PGMs are relied upon in a variety of demanding applications. PGMs are good automotive emission control catalysts because they are useful in catalyzing NO to nitrogen and to oxidize carbon monoxide (CO) and hydrocarbons, HC. The International Platinum Group Metals Association (IPA) estimates that catalytic converters fitted inside a car exhaust pipe can convert more than 90 percent of HC, CO and NO from an engine into less harmful carbon dioxide ($CO_2$), nitrogen and water vapor. But these PGM metals are in short supply and expensive. Although platinum has several advantages over other metals in terms of its high melting point, alternate options are continuously sought for variety of applications.

One of the areas of PGM application is the breakdown of carbon dioxide. The experimental results indicate that no significant effect of the Pt catalyst on the direct oxidation of carbon by $O_2$ and $NO_2$ is observed. However, in presence of $NO_2$—$O_2$ mixture, it is found that besides the well-established catalytic reoxidation of NO into $NO_2$, Pt also exerts a catalytic effect on the cooperative carbon-$NO_2$—$O_2$ oxidation reaction. An overall mechanism involving the formation of atomic oxygen over Pt sites followed by its transfer to the carbon surface is established. Thus, the presence of a Pt catalyst increases the surface concentration of —C(O) complexes which then react with $NO_2$ leading to an enhanced carbon consumption. The resulting kinetic equation allows to model more precisely the catalytic regeneration of soot traps for automotive applications.

Another area of molecular breakdown is the pursuit of hydrogen production in the global drive towards a clean and sustainable power for transportation and other applications. In water splitting cells for hydrogen production, the dissociation of water molecules into hydrogen and oxygen requires a bipolar catalytic medium. For example, it was reported that the goethite Fe+3O(OH) catalyst lowers the activation energy barrier from 5.15 eV to 1.06 eV per H—OH bond. The water dissociation rate mainly depends on the efficiency of junctional catalysts. Highly effective catalysts are in demand to minimize the overpotentials for oxygen evolution reaction (OER) and hydrogen evolution reaction (HER) towards efficient production of $H_2$ and $O_2$.

The PGMs have a D-orbital electron structure exposed on the surface of their atoms which increases surface energy to attract and energize other molecules in a temporary sticking situation or in close proximity. When other molecules stick or are in close proximity, the surface energy with free charge of overall electron cloud is changed in shape and magnitude allowing the stuck molecules to get their bonding structure stressed and rearranged or dissociated into new compounds or vice versa. The catalyst does not change. The rearranged or dissociated molecules are eventually drifted away or pushed out by new input ones (temperature and/or field caused motion) to continue the cycle unless the conditions are changed.

Surface free energy is a measure of the excess energy present at the surface of a material, in comparison to at its bulk. In the bulk form of a material, atoms in the middle are generally stable and have a balanced set of bonds/interactions. In contrast, the surface atoms will have an incomplete, unbalanced set of interactions, and therefore have unrealized bonding energy, as mentioned above, with PGM which have their D-orbital structure exposed at their surface. 'Surface energy' is a relative measurement of the energy at the surface (which is a result of this incomplete bonding). A surface always tries and minimizes its energy. This can be done by adsorbing a material with a lower energy onto its surface. Through the adsorption process, the number of exposed surface atoms with high surface energy are minimized and replaced with lower energy atoms or molecules. Therefore, a porous and foamy structure of catalyst is more effective because of the large areas of exposed surface which demonstrates high surface energy.

Generally, the aspect of surface energy for catalytic effect is positively correlated to four different phenomenal physical aspects: (1) the strength of bulk interactions, (2) the level of surface exposure, (3) the stress with non-negligible polarity, and (4) even the perturbed potential field in minimum energy. Therefore, surface energy will be higher if the bulk interactions are stronger, or if the surface exposure is greater, or the localized polarization field exists, or the localized perturbation of potential field exists with the minimum energy of carrier mobility.

A generic potential energy diagram can show the effect of a catalyst in a hypothetical exothermic chemical reaction A+B to give C. A solid line just shows a plain activation energy ($E_a$) required for either a typical exothermic or endothermic chemical reaction. With a catalytic material, the net energy requirement for reaction is drastically reduced as much as ($E_a$–$E_c$) through the catalytic process. The presence of the catalyst opens a different reaction pathway (shown in dotted line) with a lower activation energy ($E_c$<$E_a$). The final result at the end of process and the overall thermodynamics are the same. The result is simply correlated to the effect of the strength of bulk interactions and the level of surface exposure of catalytic material.

The catalytic effect by the stress field of charge potential is correlated to the non-negligible polarity in which a foreign substance gets an experience with severe bodily strain under the influence of charge potential. If the stress energy caused by the non-negligible polarity exceeds the bonding energy of foreign substance, the dissociation of foreign substance will be an inevitable consequence. The stress field is directly related to the field gradient of charge density. It is already discussed that a sharp edge has strong surface energy due to the fact of densely exposed D-orbital electron structure that attracts and adsorbs neighboring molecules to be loosely relaxed for dissociation by sharing the surface energy. Although the mechanism of surface energy for catalytic effect is not quite clearly explained yet, the practicality of using PGM for catalysis is widely accepted. Here what is known at this point is the surface energy that has a key role for a catalyst and is regarded as a virtual energy since it can be created by either the constrained geometries, such as sharpness of edges and tiny configured nano-scale bodies. Or the surface energy of sharp edges can be increased by the disparity in potential field formed by the charge density. The charge polarity may be the case caused between two fields with different magnitude or by the geometrically determined domain charge distribution or singly created a strong field density by the localized charge density at the tip of sharp edge. If any entity is located within this field gradient, it will experience a virtual stress that is created between the size-dependent field density gradients or at the areas, usually a sharp edge, where the field density is high.

It is now quite clear that the stress energy related to the surface energy can be enhanced for improved catalytic effect by applying an electric potential to the narrow body with sharp edges. An endothermic process that requires a certain amount of energy to decompose gaseous or aqueous molecules is not the only case, but it applies to the exothermic process as well for a reverse case to chemically combine. However, the energy required varies from a process to another. Table I lists the dissociation energy of chemical bonding chains of various gaseous molecules. For example, $$CO_2 \rightarrow CO+O, \Delta H=5.51 \text{ eV/molecule}$$

$$H_2O \rightarrow H^+ + OH^-, \Delta H=5.15 \text{ eV/molecule}$$

TABLE I

| Dissociation energy of chemical bonding chains | | | | |
|---|---|---|---|---|
| | | Bond-dissociation energy at 298 K | | |
| Bond | Bond Specific | (kcal/mol) | (kJ/mol) | (eV/bond) |
| C—C | in typical alkane | 83-90 | 347-377 | 3.60-3.90 |
| C—F | in CH3F | 115 | 481 | 4.99 |
| C—Cl | in CH3CL | 83.7 | 350 | 3.63 |
| F—F | fluorine | 37 | 157 | 1.63 |
| Cl—Cl | chlorine | 58 | 242 | 2.51 |
| Br—Br | bromine | 46 | 192 | 1.99 |
| I—I | iodine | 36 | 151 | 1.57 |
| H—H | hydrogen | 104 | 436 | 4.52 |
| H—F | hydrogen fluoride | 136 | 569 | 5.90 |
| O—H | In water | 119 | 497 | 5.15 |
| O—H | In methanol | 105 | 440 | 4.56 |
| O—H | in α-tocopherol (an antioxidant) | 77 | 323 | 3.35 |
| C≡O | carbon monoxide | 257 | 1077 | 11.16 |
| O=CO | carbon dioxide | 127 | 632 | 5.61 |
| O=CH₂ | formaldehyde | 179 | 748 | 7.75 |
| O=O | oxygen | 119 | 498 | 5.15 |
| N≡N | nitrogen | 226 | 945 | 9.79 |

For electro-catalytic processes, the dissociation energy of carbon dioxide is much smaller than 5.5 eV/molecule noted above.

$$CO_2 \rightarrow CO+O, \Delta H=1.35 \text{ eV/molecule for Ni—Fe electro-catalyst.}$$

In this electro-catalytic process by nano-structured Ni—Fe, the energy required for dissociation of carbon dioxide molecule is only 1.35 eV/molecule. A substantial amount of 4.15 eV/molecule is saved by the use of micro- or nano-structured Ni—Fe electro-catalyst. This is an apparent benefit of micro- or nano-structured Ni—Fe as an electro-catalyst. In this case, it is not for Ni—Fe only to play a role of substantial electro-catalytic effects. Other metal compounds may have similar role and capacity of electro-catalyst if the geometrical similarity of Ni—Fe is kept. The selection of a metal compound as an electro-catalyst is heavily dependent on chemical reactiveness of selected metal compound with the chemical ingredient for processing. Metal compounds selected as electro-catalysts should not directly get engaged into chemical reaction with chemical ingredient for processing through co-valent or ionic bonding under or at the given conditions of electro-catalytic processing.

For the case of endothermic plasma-chemical process of carbon dioxide decomposition, $$CO_2 \rightarrow CO+O, \Delta H=2.61 \text{ eV/molecule} \qquad [8].$$

In this case, there is a clear benefit of endothermic plasma-chemical process by saving 2.61 eV/molecule. The endothermic plasma-chemical process for carbon dioxide decomposition requires a volumed plasma of $CO_2$ which is a cumbersome process that requires diffuse plasma generator (s) working under a vacuum condition between $10^{-4} \sim 10^{-5}$ torr. Since the endothermic plasma-chemical process is a kind of low-pressure processing, the overall processing amount of chemical ingredient is relatively low as compared to other processes.

SUMMARY

Accordingly, it is an object of the present invention to overcome the reaction challenges in existing systems and provide a new system and method that incorporates the use of photo-enhanced electro-catalytic catalyst to efficiently create desirable reaction products.

In one example, a chemical reactor for use in the reaction and dissociation of aqueous and gaseous compounds comprises a vessel, an electro-catalytic medium, a high energy photon emission source, and a source pump. The electro-catalytic medium is fixed inside the vessel and a DC power source creates a cathode side of the electro-catalytic medium and an anode side of the electro-catalytic medium. The high energy photon emission source emits photons having a wavelength less than 100 nm, and wherein the high energy photon source is configured to be adjacent the electro-catalytic medium. The source pump injects reaction materials into the vessel to pass through the electro-catalytic material and subject it to the photons from the high energy photon emission source; and an extraction port collects the reaction or dissociation products from the vessel. The electro-catalytic medium may be formed of one or more transition metals or alloy of transition metals. The electro-catalytic medium may be comprised of a porous and foamy nano-structure. The high energy photon emission source may be embedded in the electro-catalytic medium. The high energy photon emission source may be a deuterium lamp, or alternatively a cobalt-60 source, or still further alternatively a cesium-137 source. The reaction materials may be component atoms used to form a molecule, or alternatively may be molecules used to form individual component atoms.

DETAILED DESCRIPTION

Figure 1:
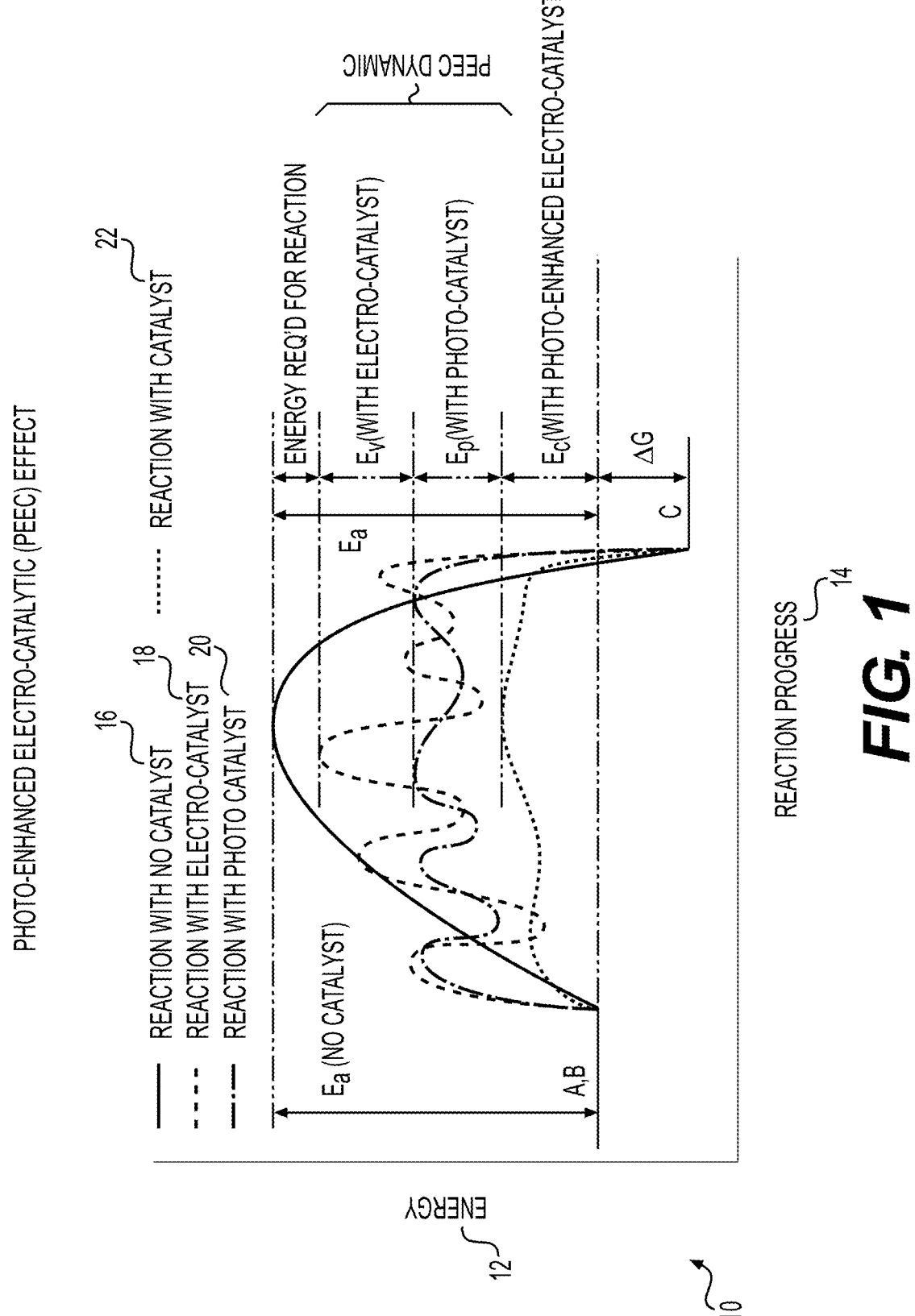
FIG. 1 is a graph illustrating the effects of the energy of activation comparing that energy with no catalyst, an electro-catalyst, a photo-catalyst and the photo-enhanced electro-catalytic system and method described herein.

In the present invention, a photo-catalyst ($E_P$) is regarded as an alternate method to replace the plasma chemical process and as an additional catalytic processing scheme on top of the micro- or nano-structured catalyst ($E_C$) and electro-catalyst ($E_V$) as described in FIG. 1. The potential energy diagram 10 of FIG. 1 illustrates the effect of photo-enhanced electro-catalyst (PEEC) 20 in a hypothetical exothermic chemical reaction A+B to give C. The graph 10 illustrates the hypothetical reaction processes of no catalyst 16, a reaction with an electro-catalyst 18, a photo-catalyst 20 and the combined photo-enhanced electro-catalyst 22.

The diagram 10 plots energy 12 on its vertical axis versus reaction progress 14 on its horizontal axis. The presence of the localized perturbed electrical field by the emitted electrons by photons in addition to the electrical charge density on the surface of catalyst lowers the energy required for catalytic reaction further from the energy maxima of electro-catalyst. The photo-catalyst offers a different reaction pathway by lowering further the activation energy ($E_a$) by $E_c+E_v+E_p$. The final result and the overall thermodynamics are the same. Based on the energy requirement for dissociation process, it is greatly beneficial to adopt the electro-catalytic method to enhance the breakdown rate of gaseous and aqueous molecules. The photo-catalyst ($E_P$) as an additional catalytic process will add a great role to reduce the required energy of chemical process. If the breakdown process of carbon dioxide is, in one particular example, contemplated for application-oriented products, such as propellant for rockets, the only limiting factor in space operation will be the power and the morphologic structure of the selected electro-catalytic material. Clearly it is preferable to have a low energy required process with a simple dissociation mechanism. Potential energy diagram shows the effect of an electro-catalyst ($E_V$) in a hypothetical exothermic chemical reaction A+B to give C. The presence of the additional electrical charge density on the surface of catalyst opens a different reaction pathway (shown in broken line with dots) by lowering the activation energy ($E_a$) by the sum of $E_c+E_v$. The result of process and the overall thermodynamics are the same, but the accumulated electrical charge density at the fine porous foamy surface structure of catalyst increases the surface energy. Any molecules adhered or adsorbed or positioned in the close proximity of catalyst can experience energy transfer from the atoms with high charge density at surface of catalyst. The energy gained by the adsorbed, adhered, or positioned molecules adjacent to the catalytic surface almost equally increase their stress energy. If this stress energy is higher than the binding energy, it causes dissociation of molecules by high stress energy. In the same manner, the contrary is true. Those atoms or molecules which have high stress energy or activation energy can undergo endothermic process for chemical bindings. Clearly, electro-catalytic effect can reduce the energy by $E_v$ further from the energy required for endothermic or exothermic process. The electro-catalytic process was well proven by the test made with the porous foamy Ni—Fe catalytic material to breakdown carbon dioxide molecules.

Figure 2:
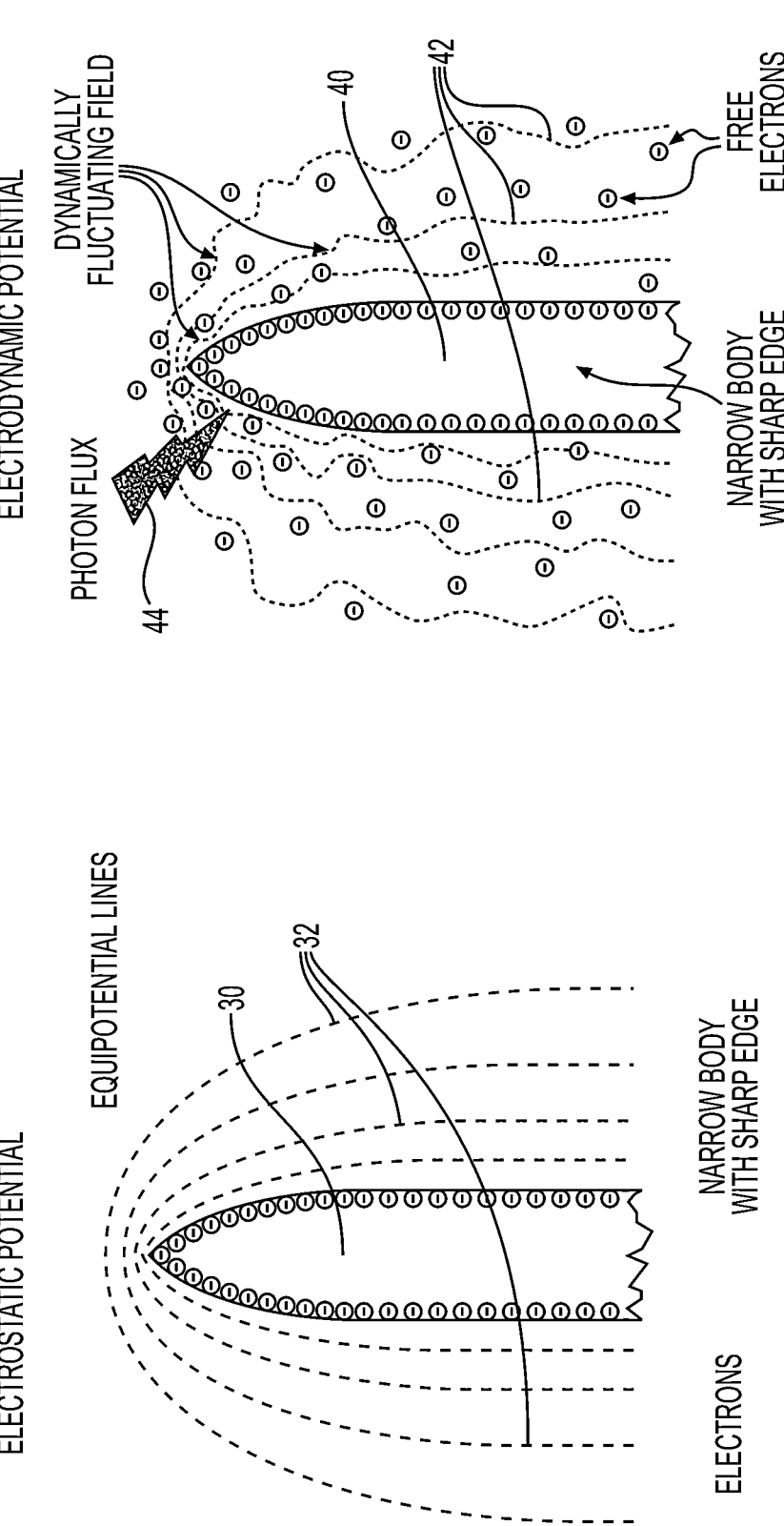
FIG. 2 illustrates the electric potential energy both with and without a photon flux.

The process and system described herein are summarily shown in FIG. 1 by adopting the injected photon energy for the benefits of (1) making gaseous or aqueous molecules to be energized by photon coupling and so reducing breakdown energy which is done by increasing collision frequency between gaseous or aqueous molecules and excited electro-catalytic body, (2) the increase in pre-breakdown probability of gaseous or aqueous molecules by loosening the bonding structures of gaseous or aqueous molecules by the energy gain after photon coupling, (3) the photo-dissociation of gaseous or aqueous molecules that requires only a few electron-volt level, also see Table I, initiated by the optical coupling mechanism, i.e. quantum mechanically creating photoelectric effect or level transitions, between molecules and photons, (4) the enhanced electro-catalytic process with increased charge density by adding increased number of the excited conduction electrons within the electro-catalytic body with sharp and tiny porous foamy structure by incident photon agitation, (5) the increased collision frequency of atoms and/or gaseous molecules to the excited electro-catalytic body under the dynamic field fluctuation by perturbed free electron motions as shown in FIG. 2, (6) the decrease in ionization potential of gaseous or aqueous molecules by tagging the free energetic electrons released through the conduction-to-free transition process from the electro-catalytic body by the incident photon energy, and (7) those electron-tagged gaseous or aqueous molecules will change the electric potential of molecules that increases the number of collision frequency between the molecules and electro-catalytic structures and be subject to the easy breakdown.

In FIG. 2, an electrically charged body 30 in the shape of a narrow body with a sharp edge has equipotential lines 32 arrayed symmetrically around that body. A similar electrically charged body 40 with a sharp edge that is also subject to a photon flux 44 displays a dynamically fluctuating field as shown in lines 42.

The combined effects of photon injection on electro-catalytic reaction from (1) through (7) stated above can translate together into further reduction of the energy which is, otherwise, required either for the endothermic or exothermic processes. The benefit appears as further reduction of process energy at least by $E_p$ as shown in FIG. 1. As discussed above, FIG. 1 shows a potential energy diagram 10 showing the effect of photo-enhanced electro-catalyst (PEEC) in a hypothetical exothermic chemical reaction A+B to give C or reciprocally in an endothermic chemical breakdown of C to A+B. The presence of the localized perturbed electrical field by the emitted electrons in addition to the electrical charge density on the surface of catalyst opens a different reaction pathway (shown in tiny dotted line) by lowering further the activation energy ($E_a$) by $E_c+E_v+E_p$. The final result of photo-enhanced electro-catalytic process and the overall thermodynamics are the same.

Figure 3:
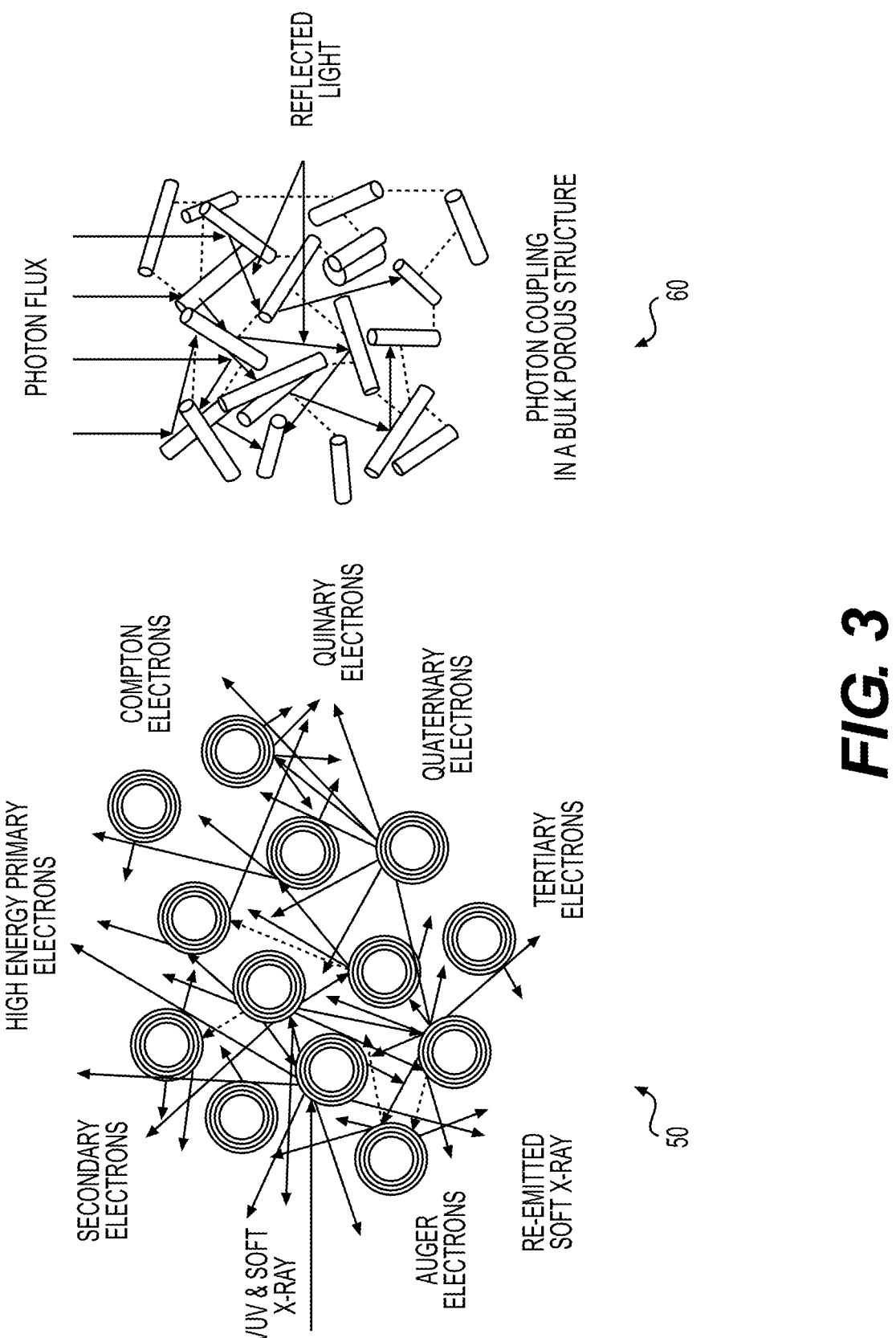
FIG. 3 is an illustration of the photo waves in a porous structure.

FIG. 3 shows how incident photons couple with atoms 50 and a porous structure 60. If the energetic photons, such as X-ray and gamma ray, are impinged on the materials, the dominant coupling mechanism of energetic photons will be with the inner shell electrons and also with nucleus of atom as depicted in the left-hand side 50 of FIG. 3. Otherwise, the photon coupling in a bulk porous structure can be described as shown in the right 60 of FIG. 3.

The energy of incident photon flux is partially absorbed by porous material and the rest is reflected, trapped into porous space, and eventually absorbed into material as shown in the right of FIG. 3. The absorbed photon energy can have partially a thermal effect to raise the temperature of material that in turn thermalizes electrons. The remaining photon energy has a direct effect on the level transitions of the electrons of an atom through the bound-to-bound and/or bound-to-free transitions. The excited electrons that undergo bound-to-bound transitions by photon couplings eventually go down to their ground state while remitting the equivalent energy of excitation. For a coupling with the incident energetic photons, the excessive photon energy causes a bound-to-free transition of electrons that liberates electrons free. Therefore, the electron emission itself from an electro-catalyst can not only increase the charge potential in the vicinity of tiny porous foamy structure that is additive to the surface energy of the electro-catalyst, but also the dynamically disturbed field by the emitted free electrons, as shown in FIG. 2, causes molecules to behave under the unstable resonant mobility with dynamic field perturbation. The dynamic field perturbation increases the collision frequency of not only among molecules, but also between molecules and an electro-catalyst. Both accelerates the energy sharing in equilibrium that might be another additive to the catalytic process.

Figure 4:
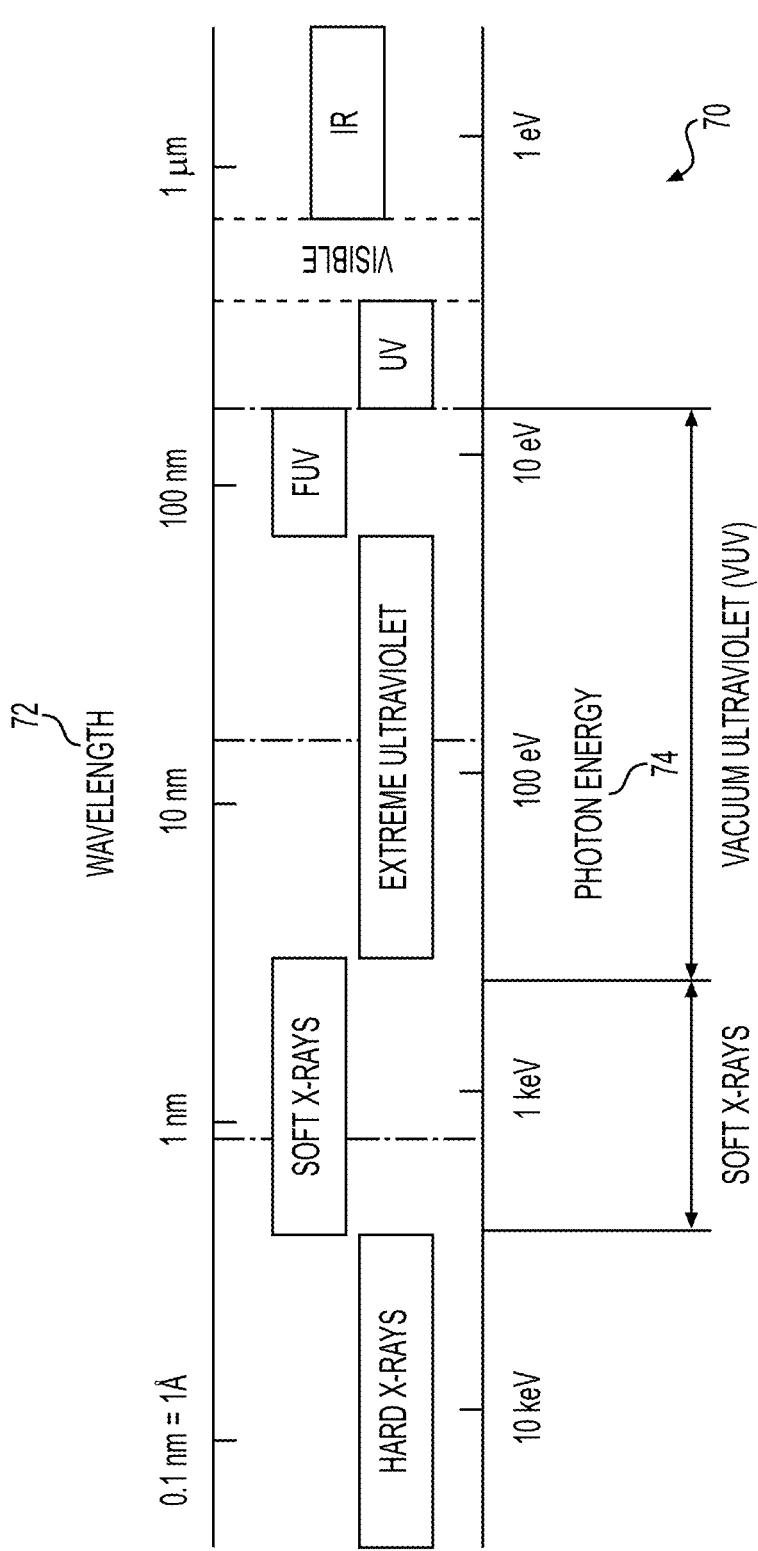
FIG. 4 is a simple chart showing examples of wavelengths and corresponding photon energies.
Figure 5:
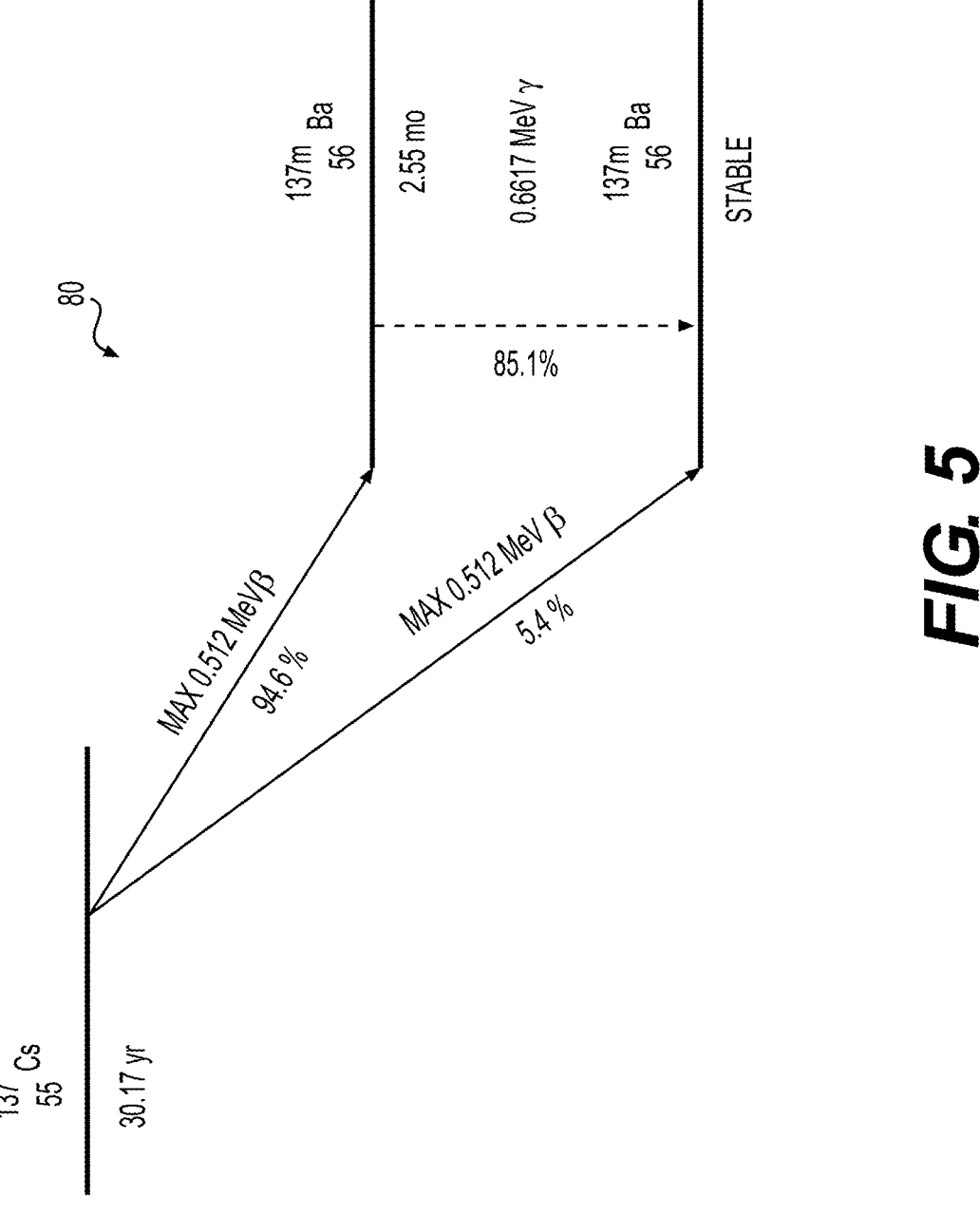
FIG. 5 is a chart illustrating the decay diagram of radio-isotope cesium-137 (Cs-137).

The systems and processes described herein are based on the photo-enhanced electro-catalyst (PEEC) concept that uses any light source(s) with emission capability of ultra-violet, vacuum ultraviolet (VUV), soft X-rays, X-rays, and even gamma rays (>100 keV). Based on the customary scientific notation 70 as shown in FIG. 4 that displays corresponding wavelengths 72 and photon energy 74, the spectral notation of VUV covers from far-UV down to extreme UV. However, the emission sources of high energy photons, such as ultraviolet, vacuum ultraviolet (VUV), soft X-rays, X-rays, and even gamma rays (>100 keV), are quite different in terms of spectral medium and device technology. The VUV spectrum generated by excited deuterium gas can be easily adopted for use with the processes and systems herein. Or the embedment of a gamma ray source, such as cesium-137 (Cs-137) which emits 661.7 keV photons (see FIG. 5 80), in the middle of electro-catalytic material enables a long-term operation without feeding any power required for catalytic process. FIG. 5 shows the decay diagram of radioisotope cesium-137 (Cs-137) that undergoes a major beta (β) decay (94.6% level) down to the intermediate level barium-137m (Ba-137m) by emitting 0.512 MeV beta particles and then gamma (γ) ray decay from Ba-137m down to a stable barium-137 (Ba-137) by emitting 0.6617 MeV gamma (γ) rays. The beta particles (or electrons) have an important role to increase the catalytic effect of photo-enhanced electro-catalyst (PEEC) by adding more energetic electrons to the photo-enhanced electro-catalyst (PEEC) process, in addition to the gamma (γ) ray into PEEC.

Figure 6:
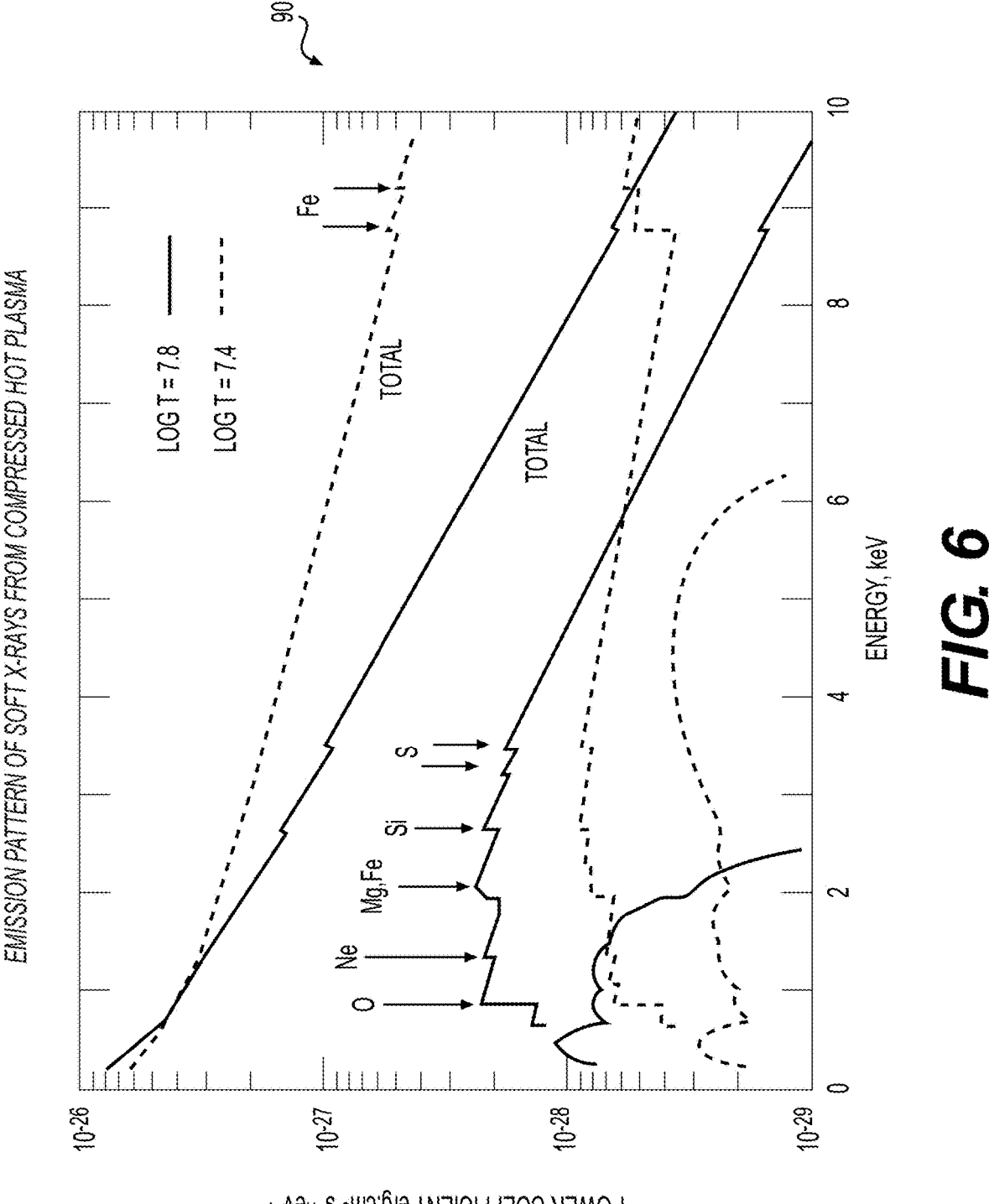
FIG. 6 is a graph illustrating the emission pattern of soft X-rays from compressed hot plasma.

The generation of soft X-rays requires more intensive energy to excite and ionize the electrons of the inner shell of atoms through the process of bound-to-free transition. The emission rate or flux density of soft X-rays is, basically, dependent on the radiative recombination rate while undergoing the level transition through recombination (free-to-bound) of excited and ionized electrons downward to the inner-shell ground state. FIG. 6 90 shows the emission rate of soft X-rays from a non-equilibrium plasma. While maintaining the ionization balance between ionization and recombination in a nonequilibrium plasma, the emission pattern, as shown in FIG. 6, can be maintained as a stable soft X-ray source.

TABLE II

| Photon sources for PEEC applications | | | | | | |
|---|---|---|---|---|---|---|
| | Photons | | | | | |
| Specifications | VUV | | X-Ray | | Gamma Ray | |
| Conventional Name | FUV | EUV | Soft X-ray | Hard X-Ray | Cs-137 | Co-60 |
| Energy | 6~30 eV | 30~700 eV | 700 eV~3 keV | 3 keV~100 keV | 660 keV | 1.3325 MeV |
| Spectral Range | 200~40 nm | 40~2 nm | 2~0.4 nm | 0.4~0.012 nm | 0.00188 nm | 0.00093 nm |
| Sources | Deuterium Lamp | $D_2$-Ar Diffusion | $D_2$-Ar Arc Discharge | $D_2$-Ar High Voltage Arc Discharge | Radioisotope | Radioisotope |
| Key Aspects for Catalytic Interaction | D-Orbital Electrons on Outermost Shell | Plus Electrons on Outer/Inner shells | Plus Electrons on Inner Shells | Plus Electrons on Intra-bands (bound-to-free) | Plus Electrons on Intra-bands (bound-to-free & free-to-free) | Plus Electrons on Intra-bands (bound-to-free & free-to-free) |
| Catalytic Effects (w/o PGM) | Better with Transition Metals | Better with Transition Metals | Better with Any Metals | Better with Any Metals | Better with Any Metals | Better with Any Metals |
| Lifetime | Mega Cycles | Mega Cycles | Kilo Cycles | Kilo Cycles | 30 yrs CW | 5 yrs CW |

Table II shows a tabulation of examples of photon sources that may be used in the systems and processes described herein. Radioisotopes, Cs-137 and Co-60, offer very attractive features for not only long-term operation, but also high energy photons to excite and liberate the intra-band electrons of atoms in catalytic medium which will exceed the dissociation energy of aqueous or gaseous molecules.

An aspect of the processes and systems herein is to use any transition metals as an electro-catalyst for dissociation of gaseous molecules under at least the seven benefits described below:

(1) Energized aqueous or gaseous molecules by photon coupling require a reduced breakdown energy through an added process of increasing collision frequency between aqueous or gaseous molecules and excited electro-catalytic body, (2) Energized aqueous or gaseous molecules by the energy gain from photon coupling loosen the bonding structures of aqueous or gaseous molecules, (3) The photo-dissociation of aqueous or gaseous molecules that requires only a few electron-volt level, also see Table I, can be pretty much done by VUV and soft X-rays even before interacting with ECM, (4) The enhanced electro-catalytic process is enabled by adding the increased number of the excited or energized conduction electrons within the electro-catalytic body of sharp and tiny structure by incident photon agitation, (5) The increased collision frequency of atoms and gaseous molecules energized by photon coupling improves the reactive function of electro-catalyst by the increased collision contact rate to the excited electro-catalytic body under the dynamic field fluctuation which is caused by the perturbed free electron motions as shown in FIG. 6, (6) The decrease in ionization potential of gaseous molecules is a possible benefit by tagging the free electrons that are available from the conduction-to-free transition process of liberated electrons which is initially under the bound-to-free transition from the electro-catalytic body by the incident photon energy, and (7) Those electron-tagged gaseous molecules can have the elevated electric potential of molecules under which the rate and energy of collision frequency between the molecules and electro-catalytic structures are increased and eventually lead to the easy breakdown.

Therefore, in order to maximize these seven potential benefits described above, a catalytic system is integrated with any emission sources of high energy photons, such as ultraviolet, vacuum ultraviolet (VUV), soft X-rays, X-rays, and even gamma rays (>100 keV), as shown in FIG. 4.

Figure 7:
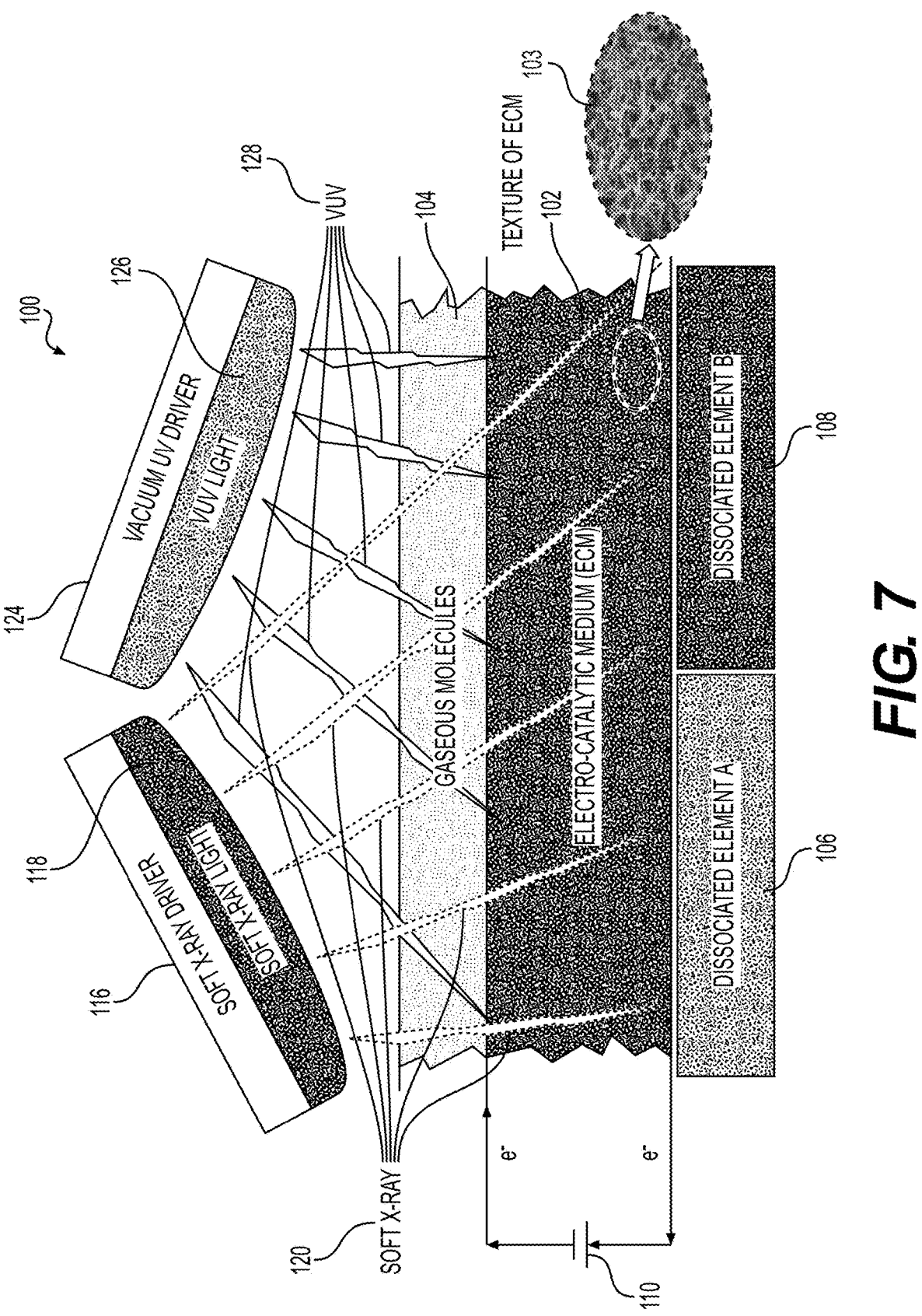
FIG. 7 is a side view of one example of a system as described herein.

In FIG. 7 there is shown a system 100. The electro-catalytic medium (ECM) 102 could be any transition metals or alloys as long as they are non-reactive to the incoming atoms and gaseous molecules 104 or dissociated elements 106 and 108 at any given conditions, such as the elevated temperature or ionized molecules, or dissociated parts of molecules, or polarized surface of ECM. The ECM 102 is charged by a DC source 110. A close-up of the foamy, rigid ECM 103 is shown. The VUV driver 124 emits VUV light 126 shown in the VUV light rays 128 which have their photon energy of 10s to 100s electron volts (eV), as shown in FIG. 4, is able to be coupled with or penetrates the gaseous medium to the surface level of ECM. The portion of VUV light rays 128 that reaches to the surface of ECM 102 can penetrate the thin level of skin of the porous foamy ECM. The energy of VUV light rays 128 that is incident and deposited on the surface of ECM 102 can radicalize the electrons of ECM to increase the charge potential at the surface. The increased charge potential at the surface of ECM 102 can accelerate the breakdown rate of incoming molecules by the increased surface energy of excited surface. A soft X-ray driver 116 is shown emitting soft X-ray light 118 in the form of the soft X-rays 120.

The energy carried by VUV is much more than the bonding energy of aqueous or gaseous molecules. Accordingly, the VUV alone has significant impacts on the activation and reaction rate of ECM for even meeting the seven benefits by the physical aspects of VUV.

Figure 8:
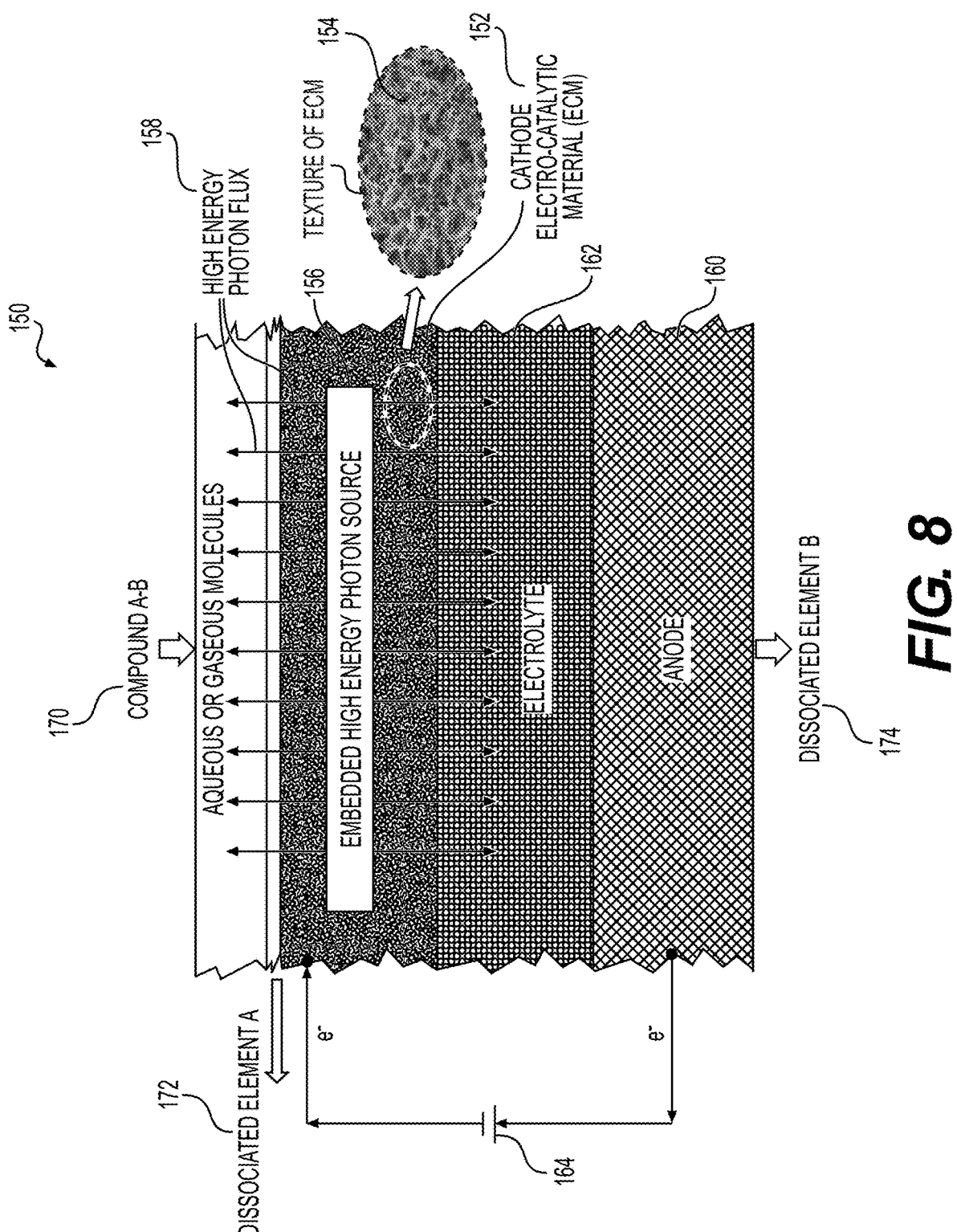
FIG. 8 is a side view of a second example of a system as described herein.

FIG. 8 shows another system that includes an example of a photo-enhanced electro-catalytic (PEEC) medium 150. The graphic illustrates the photo-enhanced ECM cathode 152 embedded with high energy photon source 156, such as X-ray and gamma ray (i.e. Cs-137). A close-up view 154 of the ECM is also provided. High energy photons 158 due to their short wavelengths have along mean-free path within material structure. Therefore, the penetration depth through ECM 152 is extensively deep. There is a great probability of interactions of high energy photons with the electrons of valence band and even intra-bands. Such photon coupling interactions liberate a large number of bound electrons to be free through the bound-to-free and free-to-free transitions. These large number of liberated energetic electrons are mostly populated on the surface area of ECM at where the charge density is drastically increased to accelerate catalytic reaction. High charge density at surface increases the adsorption rate of chemicals that are to be processed and transfers the energy of energetic electrons positioned at surface to those adsorbed, adhered, and/or very closely positioned atoms and molecules. The energy gained by these atoms and molecules increases the stress level to the co-valent or ionic bonding structure of molecules.

The structure 150 of the system shown in FIG. 8 also includes an electrolyte layer 162 and an anode layer 160. The ECM 152 and anode layer are connected and electrified by a DC source 164. In operation, a compound A-B 170 is fed into ECM 152 where it is dissociated so that dissociated elements A 172 and B 174 are separately extracted.

A certain number of liberated energetic electrons at an ECM surface departs and is emitted. These emitted electrons still carry a lot of kinetic energy and have a great probability of collision with molecules in the vicinity that gives also rise to the increase in the stress level toward the bonding structures. Or even is able to break down molecules if kinetic energy is sufficient. The high energy photons that penetrate through the ECM have also a great probability of coupling with atoms and molecules that lead to the ionization and dissociation of molecules even before reaching to the ECM for catalytic reaction.

Most of gamma ray sources have a long half-life to emanate high energy photons. For example, the half-life of Cs-137 is 30.17 years. A single installation of such a high energy photon source into ECM for catalytic process can sustain the catalytic process for a long period of time. Accordingly, the cost benefit is high.

Figure 9:
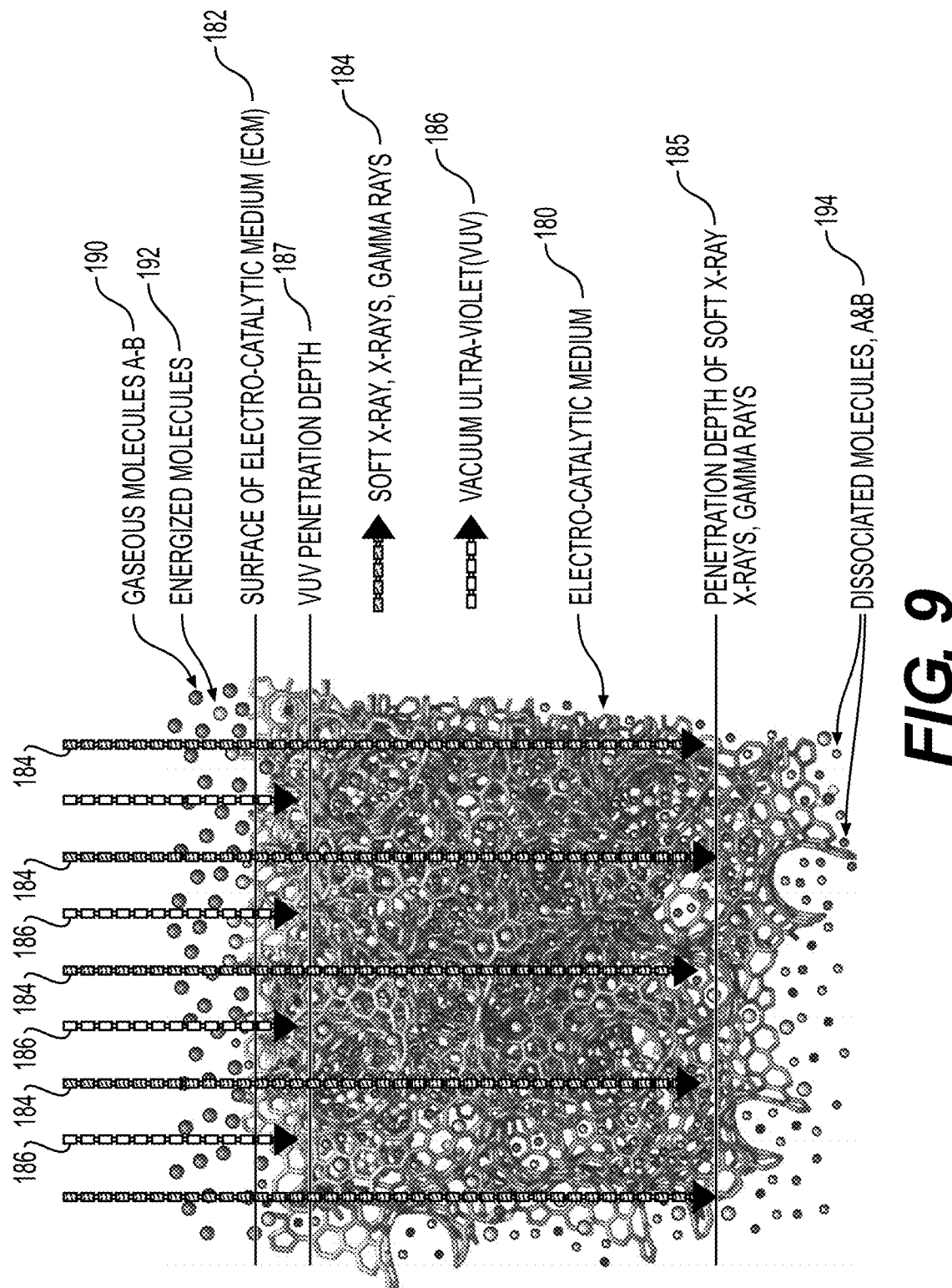
FIG. 9 is a side view of an electro-catalytic medium showing the penetration of various photo-rays penetrating therethrough.

Likewise, the X-ray and soft X-ray have a much higher impact than the VUV does. The energy and frequency of soft X-rays are sufficiently high that they can dissociate the aqueous or gaseous molecules and ionize the atoms and molecules. Also, they can penetrate the ECM much deeper than VUV. FIG. 9 depicts the penetration depth of gamma rays 184 (with a penetration depth of 185), X-ray, and soft X-rays through the ECM 180. Along the deep penetration depth 185 of high energy photons, i.e. soft X-rays, X-rays, and gamma rays, through the ECM 180, the ECM is energized and activated for accelerated catalytic effects on the reaction process of gaseous molecules. The VUV rays 186 only penetrate the ECM surface 182 to a depth 187. Table III tabulates the calculated results on penetration depths of soft X-rays into the porous and foamy structures of iron, nickel, and Ni—Fe alloy, respectively. The maximum penetration depth of 2 keV soft X-ray through 60% porosity Ni—Fe alloy is about 4 mm. The calculated results give a guideline on how thick of the Ni—Fe based ECM should be. Gaseous molecules A-B are excited by the photons to become energized molecules A-B 192. After passing through the ECM 180 those molecules 190 and 192 become dissociated atoms and molecules A and B 194.

Figure 10:
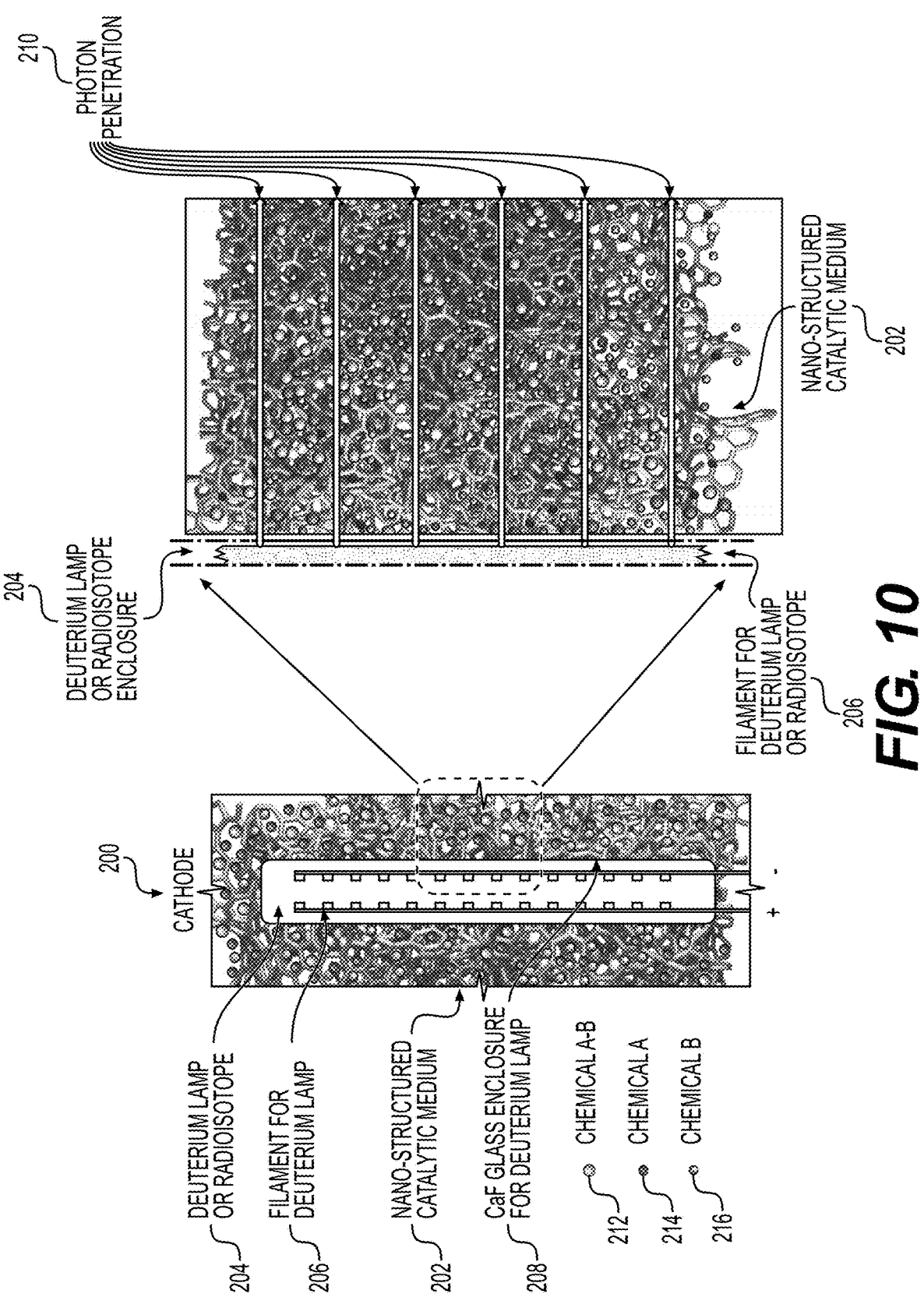
FIG. 10 is a side view of a third example of a system as described herein with a close-up of a portion of that system.

For X-ray and gamma ray, the penetration depths are quite larger than that of soft X-ray as described in FIG. 9. Hence, the catalytic benefit might also increase along with the coupling rate to increase surface energy of ECM through the penetration depth and a priori dissociation and ionization by penetrated energetic electrons and high energy photons.

the long-term operation by the long half-life of radioisotopes which do not require frequent replacement of PEEC cathode. The other is the drastically enhanced catalytic effect for exothermic or endothermic process of disintegration or synthetic process. With impinging high energy photons, VUV, soft X-ray, X-ray, and gamma ray, the catalytic process through nano-structured porous foamy ECM can be accelerated by the fact that the increased field potential by supplant electrons in the vicinity of catalytic medium surface surpasses and alleviates the overvoltage issue. The right-hand side of FIG. 10 shows the penetration depth 210 of high energy photons through the nano-structure electro catalytic medium 202. The penetration depth is determined by the photon energy and the nature of selected catalytic medium. The deeper the penetration is, the more rate of processable quantity of chemical is. Table III shows the penetration depth of iron, nickel, and alloy of nickel-iron under the exposure of soft X-ray (2 keV level). It penetrates about 4 min in average. If the photon energy is increased to a level of Cs-137 emission (660 keV), it can penetrate

TABLE III

Penetration depth of soft X-rays through porous Ni, Fe, and Ni-Fe alloy

| Soft X-ray | | Porosity | Scattering Cross-section | Penetration Depth - Solid - | Penetration Depth - Porous - |
|---|---|---|---|---|---|
| | Ni Density | | | | |
| 1 keV | 8.908 g/cm³ | 60% | 7.812E-03 cm²/g | 0.72 mm | 1.8 mm |
| 1.5 keV | 8.908 g/cm³ | 60% | 1.390E-02 cm²/g | 1.24 mm | 3.1 mm |
| 2 keV | 8.908 g/cm³ | 60% | 1.960E-02 cm²/g | 1.75 mm | 4.38 mm |
| | Fe Density | | | | |
| 1 keV | 7.860 g/cm³ | 60% | 8.777E-03 cm²/g | 0.69 mm | 1.73 mm |
| 1.5 keV | 7.860 9/cm³ | 60% | 1.530E-02 cm²/g | 1.20 mm | 3.00 mm |
| 2 keV | 7.860 g/cm³ | 60% | 2.124E-02 cm²/g | 1.67 mm | 4.18 mm |
| | Ni-Fe Density | | | | |
| 1 keV | 8.384 g/cm³ | 60% | 8.295E-03 cm²/g | 0.69 mm | 1.73 mm |
| 1.5 keV | 8.384 g/cm³ | 60% | 1.460E-02 cm²/g | 1.34 mm | 3.35 mm |
| 2 keV | 8.384 g/cm³ | 60% | 2.042E-02 cm²/g | 1.71 mm | 4.23 mm |

In one example, a combination of VUV and soft X-rays may be used for the enhancement of ECM performance. In this example, the thickness of Ni—Fe ECM can be kept larger than 4 mm, perhaps 5 mm. In other examples, using X-rays and gamma rays, the ECM thickness can be increased because of long penetration depths.

FIG. 10 shows the nano-structured porous foamy electrocatalytic medium (ECM) 202 that encapsulates a cell of photon sources in the middle, in this example a deuterium lamp 204 having a deuterium filament 206 and glass enclosure 208. Other examples of photon sources are listed in Table II. For VUV source, a specially designed deuterium lamp 204 can be placed in the middle of cathode 200. Otherwise, the photon sources such as Cs-137 or Co-60 are encapsulated in a cuvette cell made out of quartz or non-corrosive metal. The penetration 210 of the ECM 202 is shown especially in the close-up on the right side of FIG. 10. The outer surface of a cuvette cell 208 is wrapped around by nano-structured catalytic material 202 to make a cathode form 200. As shown, the chemical A-B passes through the ECM 202 to dissociate and form chemicals A and B. Because of hazardous radiation from radioisotope, a cuvette cell is fabricated through an autonomous automated process. The biggest benefits to use radioisotopes as high energy photon source for catalytic process are two folds: The one is several 10s of centimeters (cm) deep through the nano-structure electro catalytic medium. Accordingly, such high energy photon sources are very useful for mass dissociation or synthetic process required systems. As mentioned above, the system that uses high energy photons as a part of the cathode requires a completely sealed and shielded structure that keeps and contains radiation from potential leak. The soft X-rays, X-rays, and gamma rays (grey arrows) have deeper penetration than the VUV does.

Figure 11:
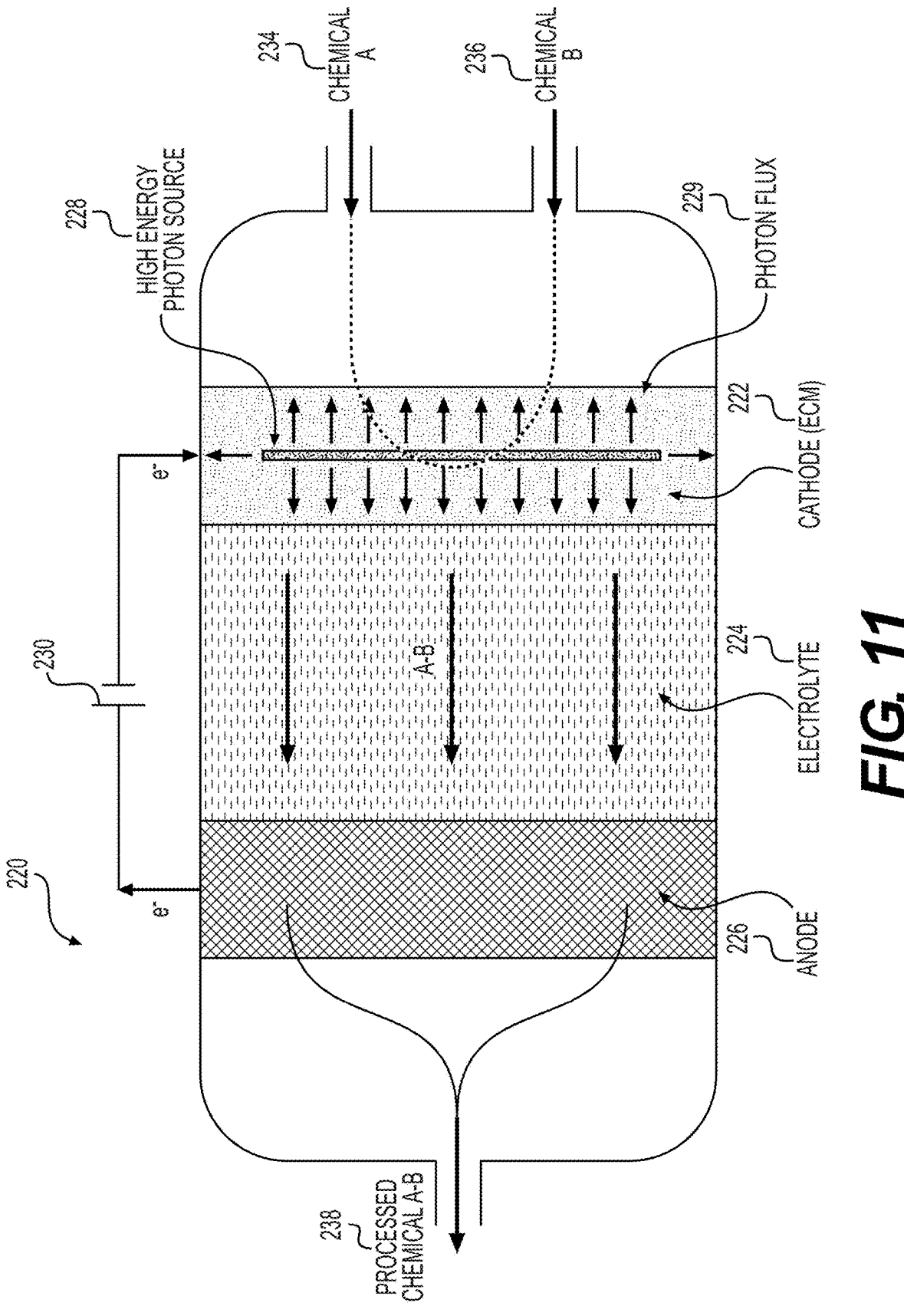
FIG. 11 is a conceptual view of a reactor containing a system as described herein in which input chemicals A and B are reacted together to form output chemical A-B.
Figure 12:
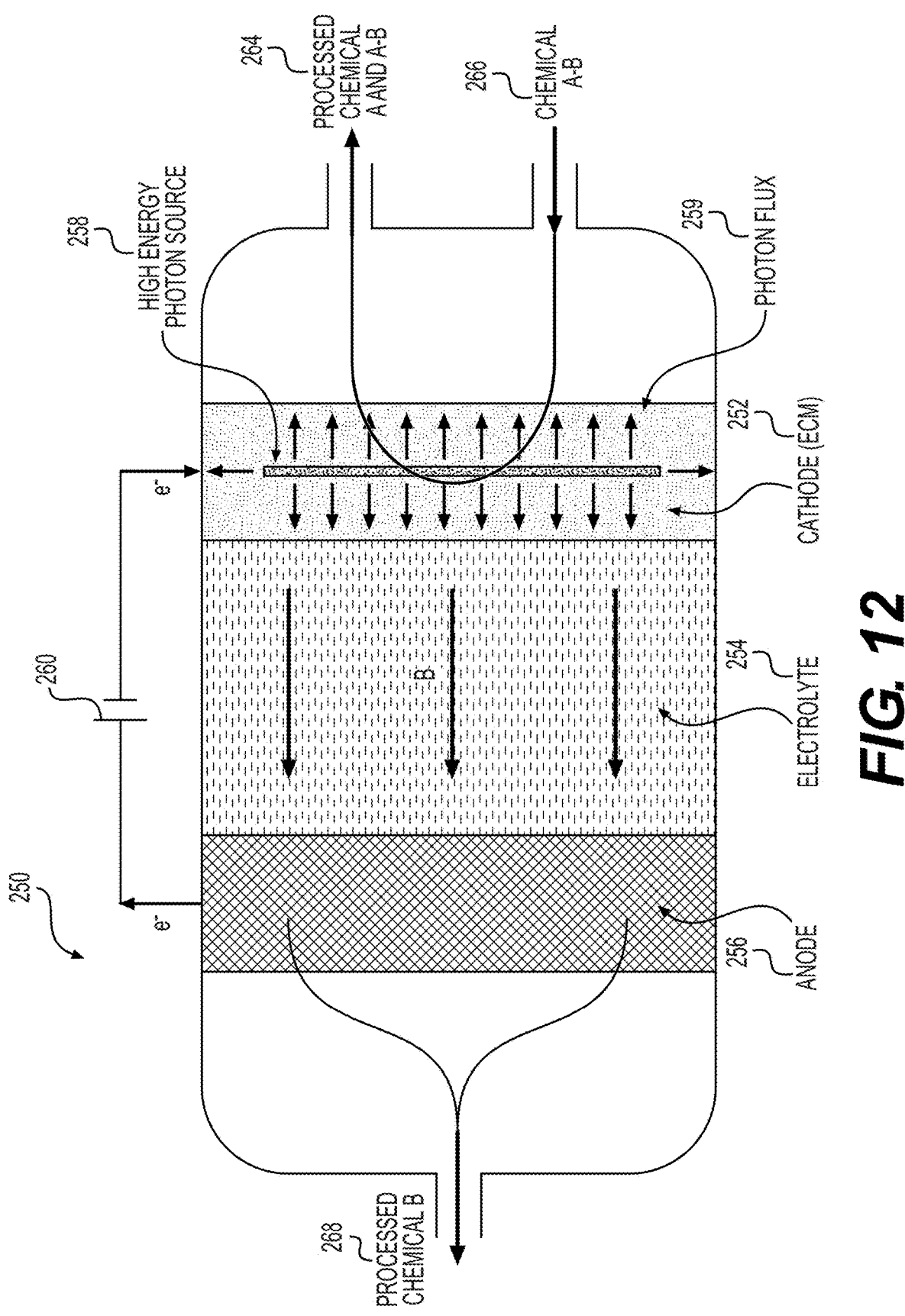
FIG. 12 is a conceptual view of a reactor containing a system as described herein in which input chemical A-B is dissociated into output chemicals A and B.

FIG. 11 shows a reversed cycle of the concept shown in FIG. 12. The chemicals A 234 and B 236 that come into the chamber 220 and are synthesized through the photo/electro assisted cathode 222 which is energized by the injection of high energy photons 229, such as VUV, soft X-rays, X-rays, and gamma rays, which is from a photon source 228 embedded into the ECM 222. The compound A-B 238 goes through the electrolyte 224 and is collected at the anode side 226. The anode 226 and cathode ECM 222 are electrified by a DC source 230.

FIG. 12 shows a conceptual description of a PEEC reactor chamber model 250. The chemical A-B 266 comes into the chamber 250 is dissociated through the cathode (ECM) 252 which is further energized by the injection of high energy photons 259 from high energy photon source 258, such as VUV, soft X-rays, X-rays, and gamma rays, which is embedded into the ECM (see FIG. 12). The dissociated component A 264 is retrieved together with the remnant of A-B while the other dissociated component B 268 goes through the electrolyte 254 and is collected at the anode side 256. The anode 256 and cathode (ECM) 252 are electrified by a DC power source 260.

The roles of high energy photons include the following:

(1) to increase the charge density of ECM surface by liberating the electrons in intra-bands of atoms, (2) to sustain the emitted energetic electrons from the ECM's porous foamy surface in order to couple with aqueous or gaseous molecules and energize or increase the stress level of molecules, (3) to induce direct dissociation of molecules by the emitted energetic electrons, (4) to keep the high energy photons to couple directly with and break down molecules a priori catalytic reaction by molecules reaching to the ECM surface or to ionize molecules.

The PEEC cathode 222, as shown in FIG. 11, can be integrated with a deuterium lamp 228 for VUV emission or a quartz cuvette that contains and holds radioisotope for X-rays and gamma rays in the middle of cathode. As discussed above, high energy photon sources, such as the X-rays and gamma ray, offer great benefits because of better and longer operations as tabulated in Table II. The deuterium lamp in the middle of electro-catalytic medium (ECM) emanates VUV to energize the ECM further to enhance the catalytic reaction.

Example One—Dissociation of CO₂

Figure 13:
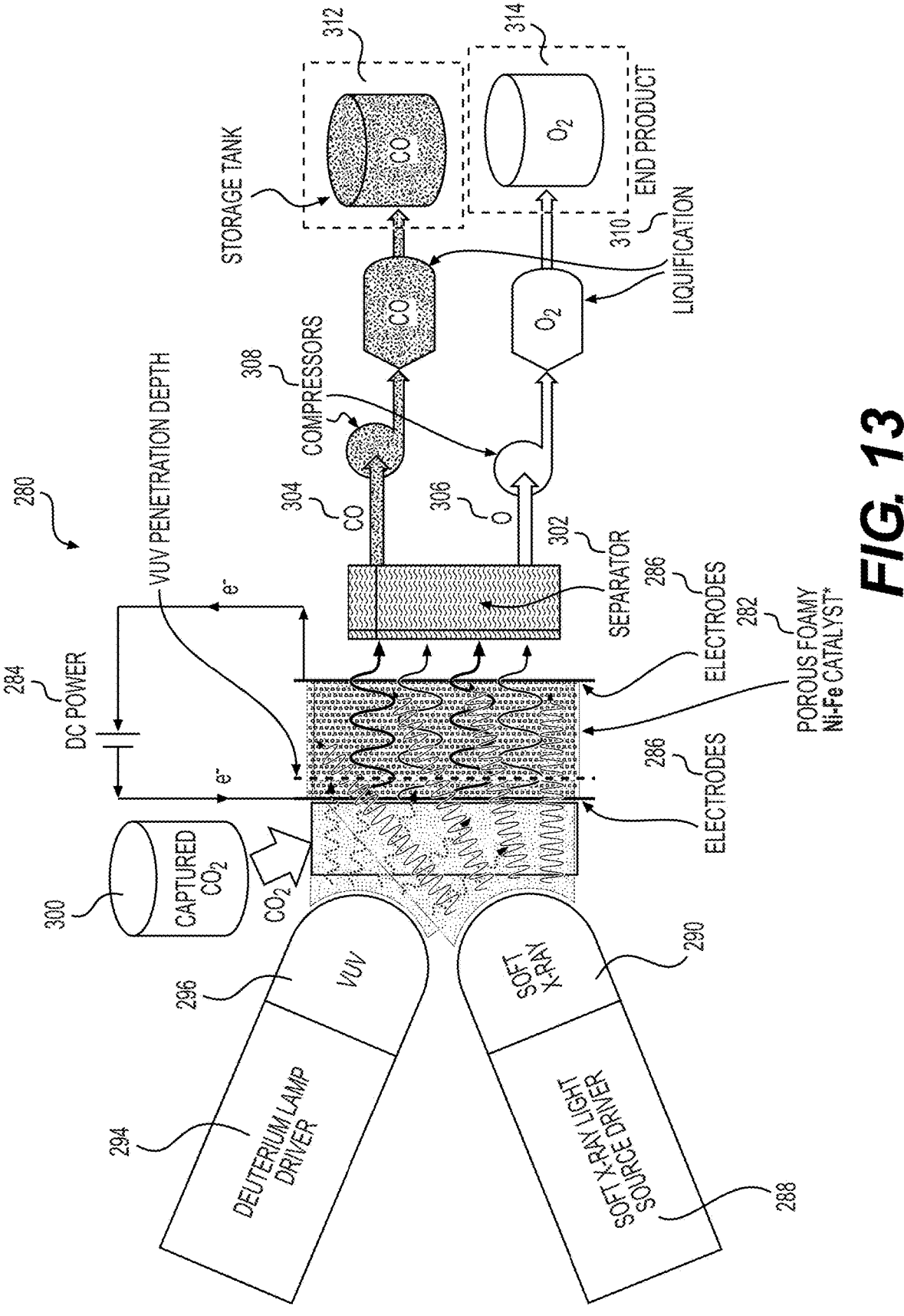
FIG. 13 is a conceptual view of a fourth example of a system as described herein in which CO2 is broken down to form CO and O2.

FIG. 13 illustrates an example of CO₂ breakdown process 280 by the photon enhanced electro-catalytic (PEEC) process. This PEEC process can be further implemented for other gaseous molecules. In space exploration, the production capabilities of oxygen, hydrogen, and methane are essential and require a most effective process for the production of fundamental chemical ingredients for synthetic polymerization and/or rocket propellants. A certain amount of CO₂ 300 is fed and dissociated through the layer of electro-catalyst 282 which is electrically charged by DC power supply 284. The system 280 of FIG. 13 includes VUV light 296 from a deuterium light source 294. There are soft X-rays 290 from a soft X-ray light source driver 288. Electrodes 286 create the electro-catalytic medium 282. The separator 302 then separates the CO 304 and O2 306 with the use of compressors 308 and liquefiers 310 before ultimately be stored in storage tanks 312 and 314.

There are several electro-catalysts available but generally the breakdown rate is very low. For example, the electro-catalyst made with nano-structure coated by depositing atomic layers of tin oxide on copper oxide nanowires shows only 13.4% breakdown rate of carbon dioxides with 90% Faradaic efficiency. Another electro-catalyst is a metallic Ni—Fe composite foam that demonstrates 97% Faradaic efficiency.

For the Ni—Fe electro-catalyst, when it is applied with 2.13 V and current density of 10 mA/cm², it performed high electricity-to-chemical fuel efficiency of 59%. The systems and processes herein, there is not only a Ni—Fe metal compound as electro-catalyst, but also other transition metal compounds as electro-catalysts for the breakdown of carbon dioxides, water, or even other chemical compounds for energy and cost-effective catalytic process. In this case, 41% of unbroken CO₂, after separation, is fed back to the Ni—Fe electro-catalyst.

The total benefit from this integrated system is to reduce the environmental gas, CO₂, and at the same time to convert it into chemically very useful oxygen, hydrogen, methane, and polymers through the described synthetic processes.

Table IV tabulates the catalytic processes of CO₂ which have been so far practiced in the university and industry laboratories, including comparatively the present PEEC process with the parameters estimated for the case when the injection of high energy photons is considered.

TABLE IV

Composition and performance metrics of low-temperature, molten carbonate and solid oxide electrolysis cells for electrochemical conversion of CO₂ into CO, evaluated at a CO-specific current density of 200 ± 30 mA cm⁻²

| References | Cell Composition | Faradaic Efficiency | Voltage (V) | ASR ($\Omega \cdot cm^2$) | Energetic Efficiency | Electric Power Consumption (kWh/Nm³) | Cost (¢/Nm³) |
|---|---|---|---|---|---|---|---|
| Ebbesen et al.[14] | LSM-YSZ \| YSZ \| Ni-YSZ | 100% | 1.0 | 0.3 | 92% | 2.4 | 31.656 |
| Kangas et al.[15] | LSCF-CGO \| CGO \| YSZ \| Ni-YSZ | 100% | 1.1 | 1.1 | 91% | 2.5 | 32.975 |
| Kaplan et al.[13] | Graphite \| Li₂O-Li₂CO₃ \| Ti | >96% | 1.1 | 1.9 | 74% | 2.9 | 38.251 |
| Verma et al.[17] | IrO₂/C-Nafion \| KOH \| Au-MWCNT-PyPBl-Nafion/C | 64% | 2.5 | 4.8 | 33% | 9.4 | 123.986 |
| Ma et al.[18] | IrO₂/C-Nafion \| KOH \| Ag/MWCNT-Nafion | 101% | 2.5 | 3.6 | 54% | 5.9 | 77.821 |
| Kutz et al.[19] | IrO₂/C-PTFE \| Suslanion \| Ag/C | 96% | 3.0 | 8.3 | 43% | 7.4 | 97.606 |
| Kaczur et al.[20] | IrO₂/C \| KHCO3 \| Sustanion-PTFE \| Ag/C | 98% | 3.0 | 13.5 | 44% | 7.2 | 94.968 |
| Dufek et al.[21] | IrO₂/Ni \| KOH \| Nafion \| K₂SO₄ \| Ag/C | 91% | 3.7 | 11.5 | 41% | 9.8 | 129.262 |
| Endrödi et al.[16] | Ir/Ti \| KHCO₃ \| Sustanion-PTFE \| Ag/C | 73% | 3.0 | 3.8 | 35% | 9.8 | 129.262 |
| Haas et al.[22] | IrO₂/MMO \| K₂SO₄-KHCO₃ \| ZrO₂ \| K₂SO₄-KHCO₃ \| Ag | 81% | 4.4 | 9.1 | 27% | 12.9 | 170.151 |
| Invented PEEC | NIFe or other transition metal compounds with KeV photons | 110% | 5.0 | 0.1 | 97% | 1.51 | 19.917 |

ASR-Area-specific resistance: $\Omega$-cm²

Figure 14:
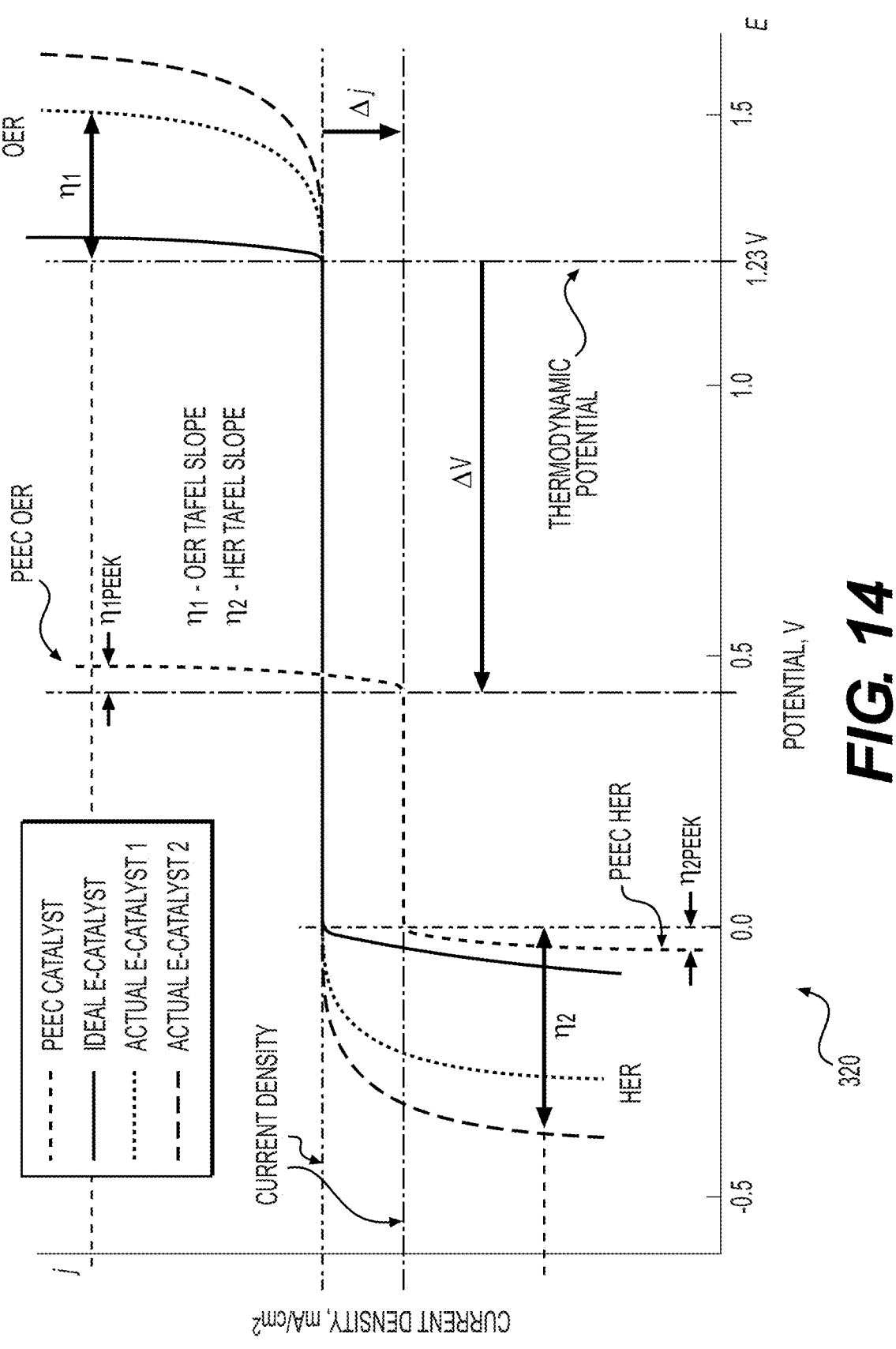
FIG. 14 is a diagram of various catalyst-assisted water dissociation mechanisms, including the PEEC technology described herein.

Table V illustrates power requirement for dissociation of $CO_2$ through the PEEC process as compared to just bond dissociation, plasma-chemical, electro-catalysis, and photo-catalysis.

from the polarization curves as shown in the performance diagram 320 in FIG. 14. The water dissociation rate mainly depends on the efficiency of junctional catalysts. Highly effective catalysts are in demand to minimize the overpo-

TABLE V

| | Power requirement for dissociation rate of $CO_2$ | | | | |
|---|---|---|---|---|---|
| $CO_2$ Dissociation Rate | Bond-Dissociation (5.51 eV/bond) [6] | Plasma-Chemical (2.61 eV/bond) [8] | Electro-catalysis (2.13 eV/bond) [13] | Photo-catalysis (1.35 eV/bond) [7] | Photo-Enhanced Eleclro-Catalysis (0.5 eV/bond) |
| 1 g/s | 12.069 kW | 5.717 kW | 4.665 kW | 2.957 kW | 1.095 kW |
| 10 g/s | 120.690 kW | 57.168 kW | 46.655 kW | 29.657 kW | 10.952 kW |
| 100 g/s | 1206.90 kW | 571.686 kW | 466.549 kW | 295.7 kW | 109.518 kW |
| 1000 g/s | 12.069 MW | 5.717 MW | 4.665 MW | 3 MW | 1.1 MW |

The dissociation process by the PEEC process requires substantially low power as compared to others listed. The PEEC process was estimated for power requirement using high energy photons that lower the energy required for breakdown.

Example Two—Dissociation of Water ($H_2O$)

In chemical reaction processes, catalysts play a crucial role in lowering the kinetic barrier. The dissociation of water molecule into hydrogen and oxygen requires a bipolar catalytic medium as well. The PGMs based on noble metals (Pt, Rh, Pd, Ru, Ir, and Os) have been used as the most efficient HER electrocatalyst in acid medium owing to its moderate hydrogen binding energy and long-life cycle. On the other hand, noble metal oxides, such as $RuO_2$ and $IrO_2$, are considered as the state-of-the-art electrocatalysts for OER. However, the high cost and scarcity of noble metals have slowed large-scale applications. And also, there are no rooms to enhance the performance of noble metals as electrocatalysts further, except for modest improvement. It has been a persisting reason to search around for any alternates. On the other hand, alkaline liquid electrolyzer technology has been commercially used because of the overall low cost of various components. Whereas the activity of Pt in alkaline electrolysis condition is about two to three orders of magnitude lower than that in acid. Significant steps have made in early studies to describe the hydrogen evolution reaction (HER) in alkaline media. The fist-step is the water dissociation as $H_2O+e^-\rightarrow H^*+OH^-$, where $H^*$ represents adsorbed H on active site, then followed by either Tafel step ($2H^*\rightarrow H_2$) or Heyrovsky step ($H_2O+H^*+e^- \rightarrow H_2+H^-$).

In efforts to reduce the cost by improving HER electroactivity, platinum alloys with transition metals were used and discovered that Pt alloys with transition metal can have similar synergistic effect of Pt for HER electroactivity. Thus, the development of highly efficient and stable electrocatalysts that bring down water dissociation barrier as low as possible and keep appropriate hydrogen adsorption/desorption strength is highly essential in industrial applications.

FIG. 14 shows a diagram of various catalyst-assisted water dissociation mechanisms, including the invented PEEC technology. The goethite $Fe^{+3}O(OH)$ catalyst lowers the activation energy barrier from 5.15 eV to 1.06 eV per H—OH bond. It is known that the performance of a catalyst for the electrocatalytic water splitting is determined by several key parameters for activity, stability, and efficiency. The activity is characterized by the overpotential, Tafel slope, and exchange current density, which can be extracted tentials for oxygen evolution reaction (OER) and hydrogen evolution reaction (HER) at cathode for efficient production of $H_2$ and $O_2$.

For electrochemical water splitting reaction, the thermodynamic potential is 1.23 V at 25° C. and 1 atm. However, due to the kinetic barrier for the reaction, water electrolysis requires a higher potential than thermodynamic potential (1.23 V) to overcome the kinetic barrier. The excess potential is also known as overpotential ($\eta$) which mainly comes from the intrinsic activation barriers present on both anode and cathode. Overpotential is a very important descriptor to evaluate the activity of the electrocatalysts. Usually, the overpotential value corresponding to the current density of 10 mA/cm$^2$ is used to compare the activities among different catalysts. This current density corresponds to a 12.3% solar-to-hydrogen efficiency.

The Tafel slope and exchange current are two other parameters to assess the activity from the overpotential vs. kinetic current relationship, which is expressed by the equation: $\eta=a+b$ log j, where $\eta$ is the overpotential, and j is the current density. In the Tafel plot, the linear correlation yields two important kinetic parameters. One is the Tafel slope b, and the other is the exchange current density $j_0$ which can be obtained by extracting the current at zero overpotential. The Tafel slope b is related to the catalytic reaction mechanism in terms of electron-transfer kinetics. For example, a smaller Tafel slope means that there is a significant current density increment as a function of the overpotential change, or in other words, faster electrocatalytic reaction kinetics. The exchange current density describes the intrinsic charge transfer under equilibrium conditions. A higher exchange current density means a greater charge transfer rate and a lower reaction barrier. A lower Tafel slope and a higher exchange current density are expected for a better electrocatalyst.

Most effective catalytic materials, no matter whether they can work on catalytic process directly or electro-assisted or photo-assisted way, are in demand for many applications. A new approach called PEEC provides better catalytic effect to answer to various demands. There are several unique features of PEEC that set its performance superior to the conventional electrocatalytic media. Either the photon source for PEEC listed in Table II is imbedded inside nano-structured ECM or the photon sources are placed outside the nano-structured ECM to illuminate the ECM, the photon energy is extremely high (10 eV~1.33 MeV) that it has a series of coupling interaction with the atoms of nano-structured ECM to liberate a large number of the intra-band electrons of atom. These many numbers of liberated free electrons still carry high energy aftermath of interactions. These electrons have a significant role to diminish or suppress the overpotentials at both HER and OER by electron-transfer kinetics, resulting in faster electrocatalytic reaction kinetics. Energetic photon-interaction induces and results in many free electrons that will increase charge potential at the surface of ECM for greater dissociation rate. The increased charge potential at the surface of ECM exceeds not only kinetic barrier (5.15 V), but also thermodynamic potential (1.23 V) by the charge potential attribution of accumulated number of free electrons at surface layer of ECM over several factor or order of magnitude to split a water molecule. Those free electrons still carrying high kinetic energy with great mobility in ECM domain play substantial role for dramatic increase in not only the charge potential to induce enhanced catalytic reaction mechanism under electron-transfer kinetics, but also exchange current density which lowers reaction barrier. High exchange current density enhances charge transfer rate by even over the required charge density to nearly diminish and nullify the overpotential issues at HER and/or OER.

In FIG. 14, the shifts in current density, $\Delta j$, and breakdown potential, $\Delta V$, are the clear indication of advantageous effects by many numbers of liberated free electrons at the surface of nano-structured ECM through coupling process of energetic photons with ECM.

Another aspect of energetic photons is direct coupling with water molecules that can eventually break down water molecules into hydrogen and oxygen but not by catalytic effect. Since higher the photon energy is, longer the mean free path is, thick ECM for anode and cathode can be used. Since thick ECM increases its volume and reaction surface area, an increased production rate of hydrogen and oxygen is anticipated. FIG. 14 shows summarily the advantageous aspects of PEEC. Table VI is the estimated performance of PEEC for comparison purpose with earlier representative concepts of electrocatalytic technology.

desorption with new reactant molecules. In terms of common understanding on catalytic process and materials, the characteristics of PEEC clearly show extraordinary approach that is advantageous and supersedes the performances of conventional processes and renders a broad option for the selections of materials for cathode and anode. As long as the selected materials for PEEC are chemically most resistant against corrosion and oxidation, they will satisfy the material requirements of PEEC.

Summary of PEEC Process Benefits

The PEEC process enhances ECM processes with the addition of VUV, X-rays, and/or gamma rays to offer multiple benefits:

1) The PEEC based nano-structured ECM can flexibly use inexpensive transition metals.
2) The rate of dissociation with any inexpensive transition metals can exceed the level of dissociation rate so far known with the PGM.
3) The ECM with high energy photon sources, such as VUV, soft X-rays, X-rays, and gamma rays, can be applicable to most of chemical synthesis and dissociation processes.
4) The interaction of ECM with energetic photons drastically increases the population density of liberated free electrons (or charge potential) at the surface of nano-structure ECM that alleviates or diminishes the overpotential issue that may happen in conventional electrocatalytic processes.
5) Artificially enhance charge potential due to the high population density of liberated free electrons through interaction of ECM with energetic photons suppresses thermodynamic potential (1.23 V) and intrinsic kinetic barrier potential (5.15 V) for faster electrocatalytic reaction kinetics by $\Delta V$ as demonstrated in FIG. 14.
6) Artificially enhance charge potential due to the high population density of liberated free electrons through

TABLE VI

| | | | | | Power requirement for dissociation rate of $H_2O$ |
|---|---|---|---|---|---|

| $H_2O$ Dissociation Rate | Bond-Dissociation (5.15 eV/bond) [6] | Electro-catalysis (2.2 eV/bond) [28] | Thermodynamic Potential (1.23 eV/bond) [27] | Goethite, Fe + 3O(OH) (1.1 eV/bond) [2] | Photo-Enhanced Electro-Catalysis (PEEC) (0.4 eV/bond) |
|---|---|---|---|---|---|
| 1 g/s | 30 kW | 12.815 kW | 7.165 kW | 5.717 kW | 2.330 kW |
| 10 g/s | 300 kW | 128.155 kW | 71.650 kW | 57.168 kW | 23.3 kW |
| 100 g/s | 3 MW | 1.281 MW | 716.500 kW | 571.686 kW | 233 kW |
| 1000 g/s | 30 MW | 12.815 MW | 7.165 MW | 5.717 MW | 2.33 MW |

$2H_2O + 15\ hv \rightarrow 2H_2 + O_2\ E = -15\ hv = -5.15\ eV = -496.924\ kJ/mol$
Breakdown rate of $H_2O$ into $2H + O$;
$1\ eV = 96.49\ kJ/mol$
$1\ kg\ of\ H_2O = 55.5\ moles$
$E = -5.15\ eV = -496.924\ kJ/mol = -27,579\ kJ/kg$
Power required: $P_{H2O} = 27,579\ kJ/s \approx 30\ MW$ for breaking down 1 kg/s of $H_2O$ Materials for PEEC Cathode and Anode There are virtually no limits on the selection of materials for the cathode and anode of PEEC since abundant energetic electrons liberated from the intraband of atom in ECM by the energetic photon source imbedded into the cathode and/or anode can surpass the thermodynamic potential (1.23 V) and intrinsic kinetic barrier potential (5.15 V) for accelerating electrocatalytic reaction kinetics and increase the exchange current density which lowers reaction barrier. It is generally known that a good catalyst would facilitate the adsorption of reactants on the surface of catalyst, their reaction, and desorption of the products to regenerate the active sites for the cyclic process of adsorption-reactioninteraction of ECM with energetic photons increases the exchange current density which lowers reaction barrier.

7) High exchange current density enhances charge transfer rate by even over the required charge density to nearly diminish and nullify the overpotential issues at HER and/or OER.
8) Energetic photons can directly couple with water molecules that leads to break down water molecules.
9) Since energetic photons can penetrate deep in ECM by long mean free path, a thick nano-structured ECM can be used for anode and cathode. Thick ECM with increased volume and reaction surface area can drastically increase the production rate of hydrogen and oxygen.

10) PEEC can use any well-proven electrocatalytic materials or extend its own use of ECM with untested metals and alloys without regard to a specific surface energy required for electrocatalytic process.

The PEEC process is a combination of ECM with energetic photon sources, such as VUV, soft X-rays, X-rays, and gamma rays, that can increase the dissociation rate with a reasonable energy consumption. The PEEC system can utilize a choice of inexpensive transition metals as electrocatalytic media since energetic photons induce high population density of liberated free electrons beyond the conventional concepts that rely on noble metals and noble metal oxides. The PEEC exceeds the conventional catalytic processes by overcoming the thermodynamic potential and intrinsic kinetic barrier potential for faster electrocatalytic reaction. The integrated dissociation or synthetic process of aqueous and gaseous molecules that will offer the production of oxygen, hydrogen, water, methane or many more chemicals as the end-products is unique.

The PEEC process can reduce the environmentally unwanted gas, carbon dioxides, and at the same time it can produce useful chemicals, oxygen, hydrogen, water, methane, and even further polymers in a single integrated system.

With the VUV, and soft X-rays, X-rays, gamma rays, an ECM can flexibly use of any inexpensive transition metals. And the rate of dissociation with any inexpensive transition metals can exceed any level of Faradaic efficiency. The ECM with VUV, and soft X-rays, X-rays, gamma rays can be applicable to most of chemical synthesis and dissociation processes.

The PEEC process has governmental applications including, but not limited to, the following:

Mars exploration requires onsite propellant production. The PEEC process will greatly help the production of oxygen, hydrogen, methane, and polymers in a single integrated system approach.

Production of oxygen and hydrogen from ice water harvested from permanently shadowed region of the Moon.

The PEEC process also has prospective industry applications:

Reduction of environmentally polluting and global warming gas, $CO_2$.

Enhanced scrubber technology to get rid of $CO_2$ at flue stacks of factories.

Enhanced chemical processes of dissociation and synthesis in an inexpensive way.

Enhanced hydrogen production.

Other embodiments of the present invention will be apparent to those skilled in the art from consideration of the specification. It is intended that the specification and Figures be considered as exemplary only, with a true scope and spirit of the invention being indicated by the following claims.

That which is claimed is:

1. A chemical reactor comprising:
a vessel;
an electro-catalytic medium fixed inside the vessel;
a DC power source connected to the electro-catalytic medium and configured so that a flow of an electric current through the DC power source creates a cathode side of the electro-catalytic medium and an anode side of the electro-catalytic medium;
a high energy photon emission source embedded in the electro-catalytic medium, and configured to emit high energy photons having a wavelength of 40 nm to 0.00093 nm towards the anode side and/or the cathode side so that the emitted high energy photons increase a surface energy of the anode side and/or the cathode side;
an inlet through which reactant materials are receivable into the vessel;
an extraction port through which reaction products are extractable from the vessel; and
a flow path that passes from the inlet, through at least a portion of the electro-catalytic medium, and to the extraction port so that at least a portion of the reactant materials receivable through the inlet are reactable at the anode side and/or the cathode side having the increased surface energy to form the reaction products.

2. The chemical reactor of claim 1,
wherein the electro-catalytic medium is formed of one or more transition metals or alloy of transition metals.

3. The chemical reactor of claim 1,
wherein the electro-catalytic medium has a porous and foamy nano-structure.

4. The chemical reactor of claim 1,
wherein the high energy photon emission source includes a deuterium lamp.

5. The chemical reactor of claim 1,
wherein the high energy photon emission source includes cobalt-60 source.

6. The chemical reactor of claim 1,
wherein the high energy photon emission source includes cesium-137.

7. The chemical reactor of claim 1,
wherein the reactant materials include atoms that are reactable to form a molecule.

8. The chemical reactor of claim 1,
wherein the reactant materials include a molecule that is reactable to decompose the molecule to component atoms of the molecule.

9. The chemical reactor of claim 1, wherein the high energy photon emission source includes a vacuum ultraviolet source, a soft X-ray source, an X-ray source, and/or a gamma ray source.

10. The chemical reactor of claim 1, wherein the emitted high energy photons have an energy of 30 eV to 1.3325 MeV.

11. The chemical reactor of claim 1, further comprising:
a cathode electrode; and
an anode electrode,
wherein the cathode electrode is in to the electro-catalytic medium, and the cathode electrode and the anode electrode are each electrifiable by the flow of electric current through the DC power source.

12. The chemical reactor of claim 11, further comprising an electrolyte between the anode electrode and the cathode electrode, adjacent to the electro-catalytic medium, and configured to transmit the reaction products from the anode side of the electro-catalytic medium to the anode electrode.

13. The chemical reactor of claim 1, wherein the high energy photon emission source includes an X-ray source and/or a gamma ray source.

14. The chemical reactor of claim 1, wherein the high energy photon emission source is further configured to emit high energy photons having an energy of 30 eV to 1.3325 MeV.

15. The chemical reactor of claim 1, wherein the high energy photon emission source is further configured to emit high energy photons having an energy of greater than 100 keV.

16. A chemical reactor comprising:

a vessel;

an electro-catalytic medium fixed inside the vessel;

a DC power source connected to the electro-catalytic medium and configured so that a flow of an electric current through the DC power source creates a cathode side of the electro-catalytic medium and an anode side of the electro-catalytic medium;

a high energy photon emission source embedded in the electro-catalytic medium, and configured to emit high energy photons having an energy of greater than 100 keV towards the anode side and/or the cathode side so that the emitted high energy photons increase a surface energy of the anode side and/or the cathode side;

an inlet through which reactant materials are receivable into the vessel;

an extraction port through which reaction products are extractable from the vessel; and a flow path that passes from the inlet, through at least a portion of the electro-catalytic medium, and to the extraction port so that at least a portion of the reactant materials receivable through the inlet are reactable at the anode side and/or the cathode side having the increased surface energy to form the reaction products.

17. A method of operating a chemical reactor including a vessel, an electro-catalytic medium fixed inside the vessel, a DC power source connected to the electro-catalytic medium, a high energy photon emission source embedded in the electro-catalytic medium, and configured to emit high energy photons, an inlet through which reactant materials are receivable into the vessel, an extraction port through which reaction products are extractable from the vessel, and a flow path that passes from the inlet, through at least a portion of the electro-catalytic medium, and to the extraction port, the method comprising:

creating a cathode side of the electro-catalytic medium and an anode side of the electro-catalytic medium by flowing an electric current through the DC power source;

emitting high energy photons having a wavelength of 40 nm to 0.00093 towards the anode side and/or the cathode side so that the emitted high energy photons increase a surface energy of the anode side and/or the cathode side;

inputting the reactant materials into the vessel through the inlet;

reacting at least a portion of the reactant materials at the anode side and/or the cathode side having the increased surface energy to form the reaction products; and extracting the reaction products from the vessel through the extraction port.

\* \* \* \* \*